US010209819B2

(12) United States Patent
Lee et al.

(10) Patent No.: US 10,209,819 B2
(45) Date of Patent: Feb. 19, 2019

(54) ELECTRONIC DEVICE

(71) Applicant: LG Display Co., Ltd., Seoul (KR)

(72) Inventors: Junghan Lee, Goyang-si (KR); InHyuk Song, Goyang-si (KR); Sungho Kim, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 28 days.

(21) Appl. No.: 15/394,692

(22) Filed: Dec. 29, 2016

(65) Prior Publication Data

US 2017/0192596 A1 Jul. 6, 2017

(30) Foreign Application Priority Data

Dec. 31, 2015 (KR) .......... 10-2015-0191783
Dec. 21, 2016 (KR) .......... 10-2016-0176017

(51) Int. Cl.
| | |
|---|---|
| G06F 3/041 | (2006.01) |
| G02F 1/133 | (2006.01) |
| G02F 1/1333 | (2006.01) |
| G02F 1/1339 | (2006.01) |
| G02F 1/1362 | (2006.01) |
| G06F 3/044 | (2006.01) |

(52) U.S. Cl.
CPC .......... *G06F 3/0416* (2013.01); *G02F 1/1339* (2013.01); *G02F 1/13306* (2013.01); *G02F 1/13338* (2013.01); *G02F 1/133308* (2013.01); *G02F 1/136286* (2013.01); *G06F 3/044* (2013.01); *G06F 3/0412* (2013.01); *G02F 2201/121* (2013.01); *G06F 2203/04105* (2013.01); *G06F 2203/04106* (2013.01)

(58) Field of Classification Search
CPC ...... G06F 3/0416; G06F 3/044; G06F 3/0412; G06F 2203/04105; G06F 1/1643; G06F 1/169; G06F 3/0411; G06F 3/0488; G06F 2200/1634; G06F 2203/04103; G06F 2203/04112; G02F 1/13338; G02F 1/136286; G02F 1/1339; G02F 1/13306; G02F 1/133308; G02F 2201/121; H01L 27/323

USPC ...... 345/173–174, 92–93, 50; 349/147, 158; 178/18.01–19.01

See application file for complete search history.

(56) References Cited

U.S. PATENT DOCUMENTS

| | | | |
|---|---|---|---|
| 2008/0062140 A1* | 3/2008 | Hotelling | G09G 3/3648 345/173 |
| 2012/0306802 A1* | 12/2012 | McCracken | G06F 3/0416 345/174 |
| 2014/0055407 A1 | 2/2014 | Lee et al. | |

(Continued)

FOREIGN PATENT DOCUMENTS

KR  10-2014-0026934  3/2014

*Primary Examiner* — Vinh T Lam

(74) *Attorney, Agent, or Firm* — Fenwick & West LLP

(57) ABSTRACT

An electronic device comprises a display module including a plurality of touch electrodes, a cover window covering a front surface of the display module, a housing including an electrically conductive housing plate disposed below a rear surface of the display module and a housing side wall surrounding at least a portion of a side surface of the display module or supporting the display module, and a driving circuit sensing variation in capacitance between one or more of the touch electrodes and the housing plate, caused by a change in distance between said one or more of the touch electrodes and the housing plate.

21 Claims, 14 Drawing Sheets

(56) References Cited

U.S. PATENT DOCUMENTS

| | | | |
|---|---|---|---|
| 2015/0189799 A1* | 7/2015 | Makelainen | G06F 3/044 345/174 |
| 2015/0234505 A1* | 8/2015 | Kurasawa | G06F 3/047 345/174 |
| 2015/0316807 A1* | 11/2015 | Cai | G02F 1/13394 428/1.54 |
| 2015/0316808 A1* | 11/2015 | Hirato | G02F 1/133371 349/138 |
| 2015/0338709 A1* | 11/2015 | Yoshida | G02F 1/136277 257/59 |
| 2015/0378472 A1* | 12/2015 | Hekstra | G06F 3/044 345/17 |
| 2016/0062498 A1* | 3/2016 | Huppi | G06F 1/3287 345/177 |
| 2016/0062504 A1* | 3/2016 | Hwang | G06F 3/0412 345/174 |
| 2016/0092010 A1* | 3/2016 | Agarwal | G06F 3/0412 345/173 |
| 2016/0103544 A1* | 4/2016 | Filiz | G06F 3/0414 345/174 |
| 2016/0216833 A1* | 7/2016 | Butler | G06F 3/0412 |
| 2016/0246417 A1* | 8/2016 | Liu | G02F 1/13338 |
| 2016/0266690 A1* | 9/2016 | Ahn | G06F 3/0412 |
| 2016/0306481 A1* | 10/2016 | Filiz | G06F 3/0414 |
| 2016/0320463 A1* | 11/2016 | O'Neill | G01R 33/283 |
| 2017/0003778 A1* | 1/2017 | Shepelev | G06F 3/0414 |
| 2017/0045976 A1* | 2/2017 | Bushnell | G06F 3/0414 |

\* cited by examiner

FIG. 11A

| 3 | 7 | 3 | 5 | 7 | 7 | 5 |
|---|---|---|---|---|---|---|
| 7 | 3 | 5 | 7 | 11 | 3 | 7 |
| 7 | 11 | 50 | 83 | 11 | 3 | 5 |
| 5 | 13 | 66 | 105 | 13 | 7 | 5 |
| 5 | 7 | 13 | 11 | 11 | 1 | 3 |
| 5 | 11 | 5 | 7 | 5 | 3 | 5 |
| 5 | 7 | 5 | 7 | 5 | 5 | 7 |

FIG. 11B

| 33 | 41 | 42 | 42 | 44 | 41 | 35 |
|---|---|---|---|---|---|---|
| 41 | 46 | 54 | 60 | 52 | 44 | 41 |
| 42 | 50 | 125 | 193 | 60 | 46 | 37 |
| 37 | 52 | 125 | 210 | 62 | 50 | 42 |
| 41 | 44 | 54 | 52 | 50 | 46 | 41 |
| 33 | 42 | 42 | 42 | 41 | 41 | 35 |
| 33 | 35 | 37 | 33 | 41 | 35 | 33 |

FIG. 12A

| 21 | 23 | 31 | 72 | 398 | 517 |
|---|---|---|---|---|---|
| 13 | 17 | 23 | 85 | 4 | 527 |
| 11 | 11 | 15 | 41 | 222 | 35 |
| 7 | 11 | 11 | 13 | 35 | 52 |
| 5 | 7 | 7 | 11 | 13 | 15 |
| 5 | 5 | 5 | 5 | 13 | 15 |
| 3 | 7 | 5 | 7 | 11 | 7 |
| 1 | 5 | 3 | 3 | 5 | 7 |
| 1 | 1 | 3 | 3 | 7 | 3 |
| 1 | 1 | 1 | 3 | 3 | 1 |

FIG. 12B

| 54 | 62 | 74 | 91 | 339 | 570 |
|---|---|---|---|---|---|
| 42 | 46 | 62 | 93 | 4 | 582 |
| 35 | 37 | 50 | 70 | 242 | 48 |
| 31 | 27 | 37 | 44 | 72 | 113 |
| 23 | 25 | 33 | 31 | 42 | 50 |
| 21 | 21 | 27 | 31 | 33 | 35 |
| 15 | 17 | 27 | 27 | 27 | 27 |
| 11 | 15 | 17 | 21 | 21 | 23 |
| 11 | 7 | 15 | 17 | 17 | 17 |
| 11 | 5 | 7 | 13 | 13 | 15 |

| 1 | -6 | -4 | 0 | 0 | 1 | -6 |
|---|----|----|---|---|---|----|
| 0 | 1 | 1 | 0 | 1 | 0 | 0 |
| 0 | 3 | -4 | 25 | -4 | 1 | -4 |
| 0 | -4 | 5 | 115 | 3 | -4 | 1 |
| -4 | 0 | 0 | 0 | 0 | 0 | -4 |
| -4 | -4 | 0 | 0 | 0 | 0 | -4 |
| 1 | 1 | 1 | 0 | 1 | 3 | 0 |

| 11 | 3  | 5  | 7  | 5  | 5 | 7  |
|----|----|----|----|----|---|----|
| 7  | 3  | 7  | 5  | 5  | 5 | 3  |
| 11 | 7  | 15 | 52 | 17 | 5 | 11 |
| 5  | 5  | 46 | 357| 60 | 11| 3  |
| 5  | 11 | 17 | 50 | 17 | 5 | 7  |
| 5  | 7  | 15 | 7  | 5  | 7 | 7  |
| 5  | 5  | 5  | 7  | 7  | 5 | 5  |

ELECTRONIC DEVICE

CROSS-REFERENCE TO RELATED APPLICATIONS

This application claims the benefit of the Korean Patent Applications Nos. 10-2015-0191783 filed on Dec. 31, 2015, and 10-2016-0176017 filed on Dec. 21, 2016, which are hereby incorporated by reference as if fully set forth herein.

BACKGROUND

Field of the Invention

The present invention relates to an electronic device having a force touch function.

Discussion of the Related Art

Touch screen devices are a type of input device where information is input by touching a screen of a display device without a separate input device in various kinds of electronic devices. The touch screen devices are being used as input devices of various products such as televisions (TVs), notebook computers, monitors, etc., in addition to mobile electronic devices such as electronic notebooks, e-books, portable multimedia players (PMPs), navigation devices, ultra-mobile personal computers (UMPCs), mobile phones, smartphones, smartwatches, tablet personal computers (PCs), watch phones, mobile communication terminals, etc.

Recently, as a user interface environment such as applications requiring touch information about a force touch is established, electronic devices having a force touch function of sensing the force touch are being researched and developed.

For example, Korean Patent Publication No. 10-2014-0026934 discloses a touch display device that senses a force touch by using a plurality of sensing electrodes formed of a piezoresistive material of which a resistance value varies according to an applied touch force.

However, since a related art touch display device senses a force touch by using a change in resistance of a piezoresistive material, the related art touch display device cannot sense the force touch when a touch pressure is equal to or more than a threshold value. Also, in the related art touch display device, since a touch processor is connected to the sensing electrodes in a one-to-one relationship, the number of electrode channels increases, and for this reason, it takes longer for touch data processing. Also, in the related art touch display device, since a touch screen panel is disposed on a display panel, the touch screen panel can be damaged by external impact.

SUMMARY

Accordingly, the present invention is directed to provide an electronic device that substantially obviates one or more problems due to limitations and disadvantages of the related art.

An aspect of the present invention is directed to provide an electronic device which senses a force touch, based on a variation of a capacitance caused by the force touch.

Another aspect of the present invention is directed to provide an electronic device which senses a force touch by using a capacitance variation between a metal instrument and a touch electrode provided in a display panel without a force sensing panel.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an electronic device comprising a display module including a plurality of touch electrodes, a cover window covering a front surface of the display module, a housing including an electrically conductive housing plate disposed below a rear surface of the display module and a housing side wall surrounding at least a portion of a side surface of the display module or supporting the display module, and a driving circuit sensing variation in capacitance between one or more of the touch electrodes and the housing plate, caused by a change in distance between said one or more of the touch electrodes and the housing plate.

In the electronic device according to an embodiment, the display module may comprise a lower substrate including a gate lines, data lines, and the touch electrodes that function as a common electrode during a display mode, an upper substrate bonded to the lower substrate, and a liquid crystal layer between the upper substrate and the lower substrate. In the electronic device according to an embodiment, the display module may further include a transparent conductive layer provided on a rear surface of the lower substrate.

The electronic device according to an embodiment may further include a buffering member disposed in the housing plate and spaced apart from the rear surface of the display module, the buffering member is positioned so as not to overlap a rear edge of the display module.

The electronic device according to an embodiment may further include a module supporting member vertically provided between a rear edge of the display module and the housing plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 11A and 11B are diagrams for describing a simulation result obtained by experimenting on a touch sensitivity based on a touch pressure in an electronic device according to an embodiment;

FIGS. 12A and 12B are diagrams for describing a simulation result obtained by experimenting on a touch sensitivity in an embodiment of the present invention and a comparative example;

DETAILED DESCRIPTION OF THE INVENTION

Figure 1:
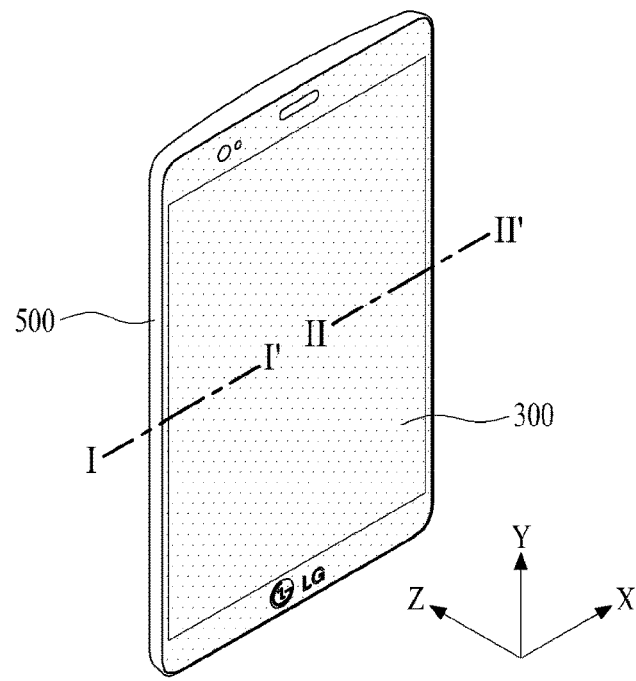
FIG. 1 is a perspective view illustrating an electronic device according to an embodiment.

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, exemplary embodiments of an electronic device according to the present invention will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present invention, the detailed description will be omitted.

Figure 2:
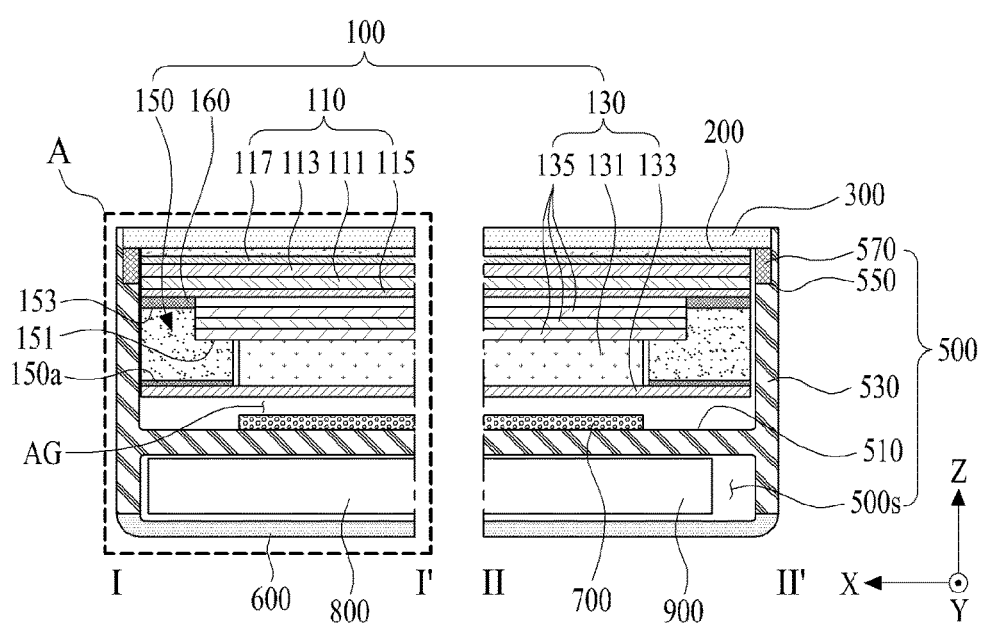
FIG. 2 is a cross-sectional view taken along line I-I' and line II-II' illustrated in FIG. 1.
Figure 3:
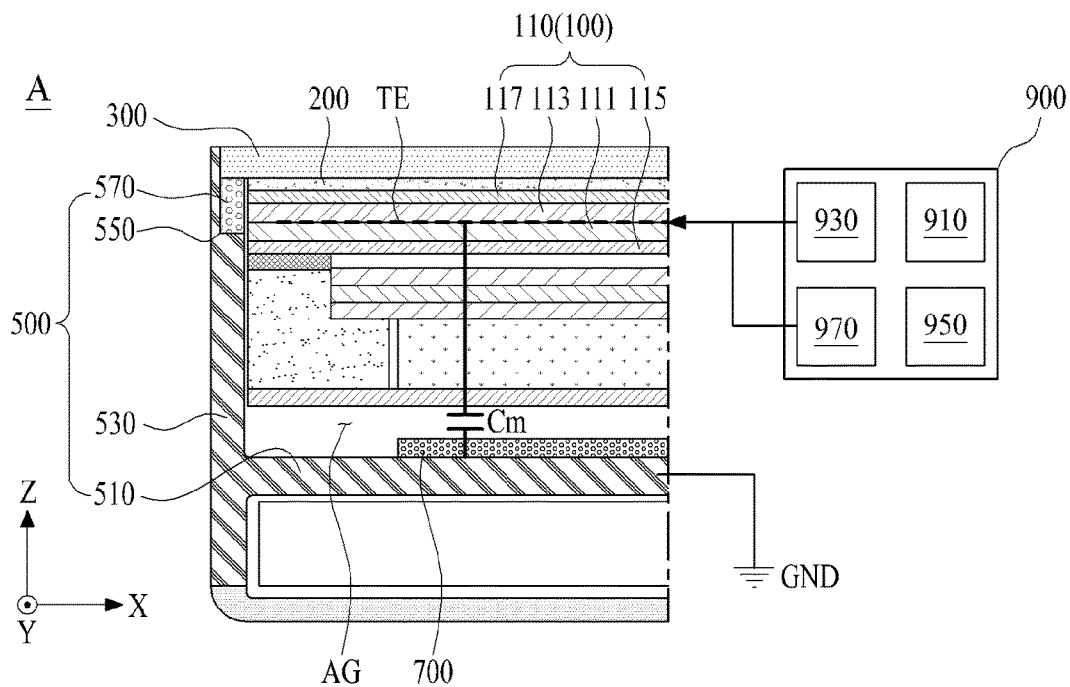
FIG. 3 is an enlarged view of an A portion illustrated in FIG. 2.
Figure 4:
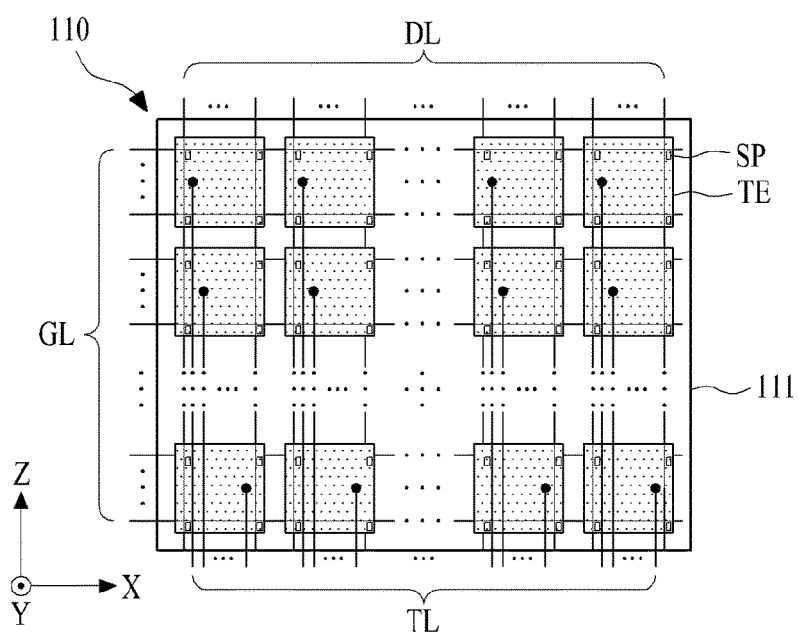
FIG. 4 is a diagram for describing a display panel illustrated in FIG. 2.

FIG. 1 is a perspective view illustrating an electronic device according to an embodiment. FIG. 2 is a cross-sectional view taken along line I-I' and line II-IF illustrated in FIG. 1. FIG. 3 is an enlarged view of an A portion illustrated in FIG. 2. FIG. 4 is a diagram for describing a display panel illustrated in FIG. 2.

Referring to FIGS. 1 to 4, the electronic device according to an embodiment may include a display module 100, a cover window 300, a housing 500, a buffering member 700, and a driving circuit unit 900.

The display module 100 may be driven in a display mode or a touch sensing mode according to control by the driving circuit unit 900. That is, in the display mode, the display module 100 may display an image corresponding to an image signal supplied from the driving circuit unit 900. Also, in the touch sensing mode, the display module 100 may include a touch sensor for sensing at least one of a touch position and a touch force based on a user touch according to control by the driving circuit unit 900.

The display module 100 according to an embodiment may include a display panel 110, a backlight unit 130, and a guide frame 150.

The display panel 110 may be a liquid crystal display panel which displays an image according to driving of liquid crystal molecules, and may include a lower substrate 111 and an upper substrate 113 which are opposite-bonded to each other with a liquid crystal layer (not shown) therebetween. The display panel 110 may display an image by using light irradiated from the backlight unit 130.

The lower substrate 111 may be a thin film transistor (TFT) array substrate and may include a plurality of subpixels SP respectively provided in a plurality of pixel areas defined by intersections of a plurality of gate lines GL and a plurality of data lines DL. Each of the plurality of subpixels SP may include a TFT connected to a gate line and a data line, a pixel electrode connected to the TFT, and a common electrode which is disposed adjacent to the pixel electrode and is supplied with a common voltage.

A pad part (not shown) connected to each of a plurality of signal lines may be provided in a lower edge of the lower substrate 111 and may be connected to the driving circuit unit 900. Also, a built-in gate driving circuit (not shown) for driving the gate lines of the display panel 110 may be provided in a left edge and/or a right edge of the lower substrate 111. The built-in gate driving circuit may be connected to the gate lines GL and may be manufactured simultaneously with a process of manufacturing the TFT of each pixel. The built-in gate driving circuit may generate a sequentially shifted gate signal and may supply the gate signal to a corresponding gate line GL according to a gate control signal supplied from the driving circuit unit 900.

The upper substrate 113 may include a pixel defining pattern, which defines an opening area overlapping each pixel area provided in the lower substrate 111, and a color filter which is provided in the opening area. The upper substrate 113 may be opposite-bonded to the lower substrate 111 by a sealant with the liquid crystal layer therebetween and may cover the other whole portion of the lower substrate 111 except the pad part of the lower substrate 111.

At least one of the lower substrate 111 and the upper substrate 113 may include an alignment layer (not shown) for adjusting a pre-tilt angle of liquid crystal. The liquid crystal layer may be disposed between the lower substrate 111 and the upper substrate 113 and may include liquid crystal consisting of liquid crystal molecules which are aligned in a horizontal direction according to a lateral electric field generated by a data voltage applied to the pixel electrode and the common voltage in each of the plurality of subpixels SP.

A lower polarizing member 115 having a first polarization axis may be attached to the rear surface of the lower substrate 111, and an upper polarizing member 117 having a second polarization axis intersecting the first polarization axis may be attached to a front surface of the upper substrate 113.

In the display panel 110, the touch sensor may be a touch electrode TE which is used as the common electrode in the touch sensing mode, and in the display mode, the touch sensor may be supplied with the common voltage and thus may be used as a liquid crystal driving electrode along with the pixel electrode. That is, the display panel 110 may be an in-cell touch type liquid crystal display panel, and in more detail, the display panel 110 may be a self-capacitance in-cell touch type liquid crystal display panel.

The touch electrode TE according to an embodiment may be patterned in units of a plurality of adjacent subpixels SP and thus may overlap at least one gate line GL and at least one data line DL. The pixel electrode and the touch electrode TE may be formed of a transparent conductive material such as indium tin oxide (ITO) or the like. The touch electrode TE may be connected to the driving circuit unit 900 through a touch routing line TL.

One touch electrode TE may have an area corresponding to a plurality of subpixels SP. For example, the one touch electrode TE may have an area which corresponds to forty pixels in a horizontal direction parallel to a lengthwise direction of the gate line GL and corresponds to twelve pixels in a vertical direction parallel to a lengthwise direction of the data line DL. In this case, the one touch electrode TE may have an area corresponding to 480 pixels. However, the present embodiment is not limited thereto, and a size of the touch electrode TE may be adjusted based on a size (or a resolution) and a touch resolution of the display panel 110. Also, a plurality of touch electrodes TE may be arranged in a lattice type in the display panel 110. In this case, the plurality of touch electrodes TE may not have the same size, and a plurality of second touch electrodes disposed in an edge of the display panel 110 may be smaller in size than a plurality of first touch electrodes disposed in a center of the display panel 110. In this case, a touch sensitivity between the center and the edge of the display panel 110 is uniform.

The backlight unit 130 may be disposed under the display panel 110 and may irradiate light onto the display panel 110. The backlight unit 130 according to an embodiment may include a light guide plate 131, a light source unit (not shown), a reflective sheet 133, and an optical sheet part 135.

The light guide plate 131 may include a light incident part which is at least provided on one side. The light guide plate 131 may guide light, which is incident through the light incident part, in a direction toward a top (i.e., toward the display panel 110).

The light source unit may be disposed to face the light incident part of the light guide plate 131 and may irradiate light onto the light incident part of the light guide plate 131. The light source unit according to an embodiment may include a printed circuit board (PCB) disposed adjacent to the light incident part of the light guide plate 131 and a plurality of light emitting diodes (LEDs) mounted on the PCB.

The reflective sheet 133 may be disposed in the housing 500 and may cover a rear surface of the light guide plate 131. The reflective sheet 133 may reflect light, which is incident through a bottom of the light guide plate 131, toward the inside of the light guide plate 131, thereby minimizing the loss of the light.

The optical sheet part 135 may be disposed on the light guide plate 131 to enhance the luminance characteristic of light irradiated from the light guide plate 131. For example, the optical sheet part 135 may include a diffusive sheet, a prism sheet, and dual brightness enhancement film, but is not limited thereto. In other embodiments, the optical sheet part 135 may include a stacked combination of two or more elements selected from among a diffusive sheet, a prism sheet, a dual brightness enhancement film, and a lenticular sheet.

In addition, the display module 100 may further include a viewing angle control film disposed between the display panel 110 and the optical sheet part 135. The viewing angle control film may be provided to overlap each of the plurality of subpixels SP and may limit a light irradiation angle of each subpixel SP, thereby limiting a viewing angle of the display panel 110 to a predetermined range.

The guide frame 150 may be provided in a tetragonal belt shape and may be attached to a rear edge of the display panel 150. Also, the guide frame 150 may surround each of side surfaces of the backlight unit 130, thereby minimizing a movement of the backlight unit 130. The guide frame 150 according to an embodiment may include a sheet supporting part 151 and a panel supporting part 153.

The sheet supporting part 151 may be provided in a tetragonal belt shape to overlap the backlight unit 130, namely, an edge of the optical sheet part 135 and may support the edge of the optical sheet part 135. A bottom of the sheet supporting part 151 may be attached to an extension area of the reflective sheet 133 by an adhesive member 150a.

In addition, the sheet supporting part 151 may further include a light guide plate supporting part that protrudes from an inner surface of the sheet supporting part 151 to overlap the light guide plate 131. The light guide plate supporting part may support a bottom edge of the light guide plate 131.

The panel supporting part 153 may protrude from a top edge of the sheet supporting part 151 in a tetragonal belt shape and may be attached to a rear edge of the display panel 110 by a panel adhesive member 160. Here, the panel adhesive member 160 may include a double-sided tape, a thermocurable resin, a photocurable resin, a double-sided adhesive foam pad, or the like.

The guide frame 150 may be attached to the display panel 110 to support the backlight unit 130, and thus, the backlight unit 130 may be hung on a rear surface of the display panel 110.

The cover window 300 may be attached to the entire front surface of the display panel 110 and may be supported by the housing 500. In this case, the cover window 300 may be movably supported by the housing 500 and may be concavely deformed toward the housing 500 according to a touch pressure of a user.

The cover window 300 may be attached to the entire front surface of the display panel 110 (in more detail, an upper polarizing member 117) by a transparent adhesive member 200 and may support the display panel 110, thereby protecting the display panel 110 from an external impact. Here, the transparent adhesive member 200 may include an optical clear adhesive (OCA), an optical clear resin (OCR), or the like, The cover window 300 according to an embodiment may be formed of tempered glass, transparent plastic, a transparent film, or the like. For example, the cover window 300 may include at least one of sapphire glass and gorilla glass. As another example, the cover window 300 may include at least one of polyethyleneterephthalate (PET), polycarbonate (PC), polyethersulfone (PES), polyethylenapthanate (PEN), and polynorborneen (PNB). The cover window 300 may be formed of tempered glass, based on scratch and transparency.

The housing 500 may accommodate the display module 100 and may support the cover window 300. That is, the housing 500 may directly surround side surfaces and a rear surface of the display module 100 attached to the cover window 300.

The housing 500 according to an embodiment may include an accommodating space which is defined by a housing plate 510 and a housing side wall 530. The housing 500 may have a box shape with a top opened. The housing 500 may be formed of a conductive material, a metal material, and/or the like. Here, the housing 500 may be formed of aluminum (Al), invar, magnesium (Mg), and/or the like. The housing 500 according to an embodiment may be electrically connected to a power supply circuit and may be supplied with a direct current (DC) voltage or an alternating current (AC) voltage having a certain voltage level from the power supply circuit or may be electrically grounded (GND). The following description will be made on the assumption that the housing 500 is electrically grounded.

The housing plate 510 may be a floor of the accommodating space and may cover a rear surface of the backlight unit 130.

At least one system accommodating space 500s may be provided in a rear surface of the housing plate 510. A battery 800 for supplying a driving power, a communication module (not shown), a power circuit (not shown), a memory (not shown), the driving circuit unit 900 of the electronic device, and/or the like may be accommodated into the system accommodating space 500s. The system accommodating space 500s may be covered by a rear cover 600. The rear cover 600 may be coupled to the rear surface of the housing 500 so as to be opened or closed for replacing the battery 800, but is not limited thereto. In other embodiments, when the electronic device uses an embedded-type battery, the rear cover 600 may be coupled to the rear surface of the housing 500 so as not to be opened or closed by a user.

The housing side wall 530 may be provided vertical to each of side surfaces of the housing plate 510. The housing side wall 530 may support the cover window 300 to directly surround each of side surfaces of the display module 100 hung on the cover window 300. In this case, an upper portion of the housing side wall 530 may directly surround each of side surfaces of the cover window 300.

The housing side wall 530 may have a height which is higher than a total height (or thickness) of the display module 100, and may separate the display module 100, hung on the cover window 300, from the housing plate 510. Therefore, the electronic device according to an embodiment may include an air gap AG provided between the housing plate 510 and the display module 100 which is hung on the cover window 300.

The air gap AG may be defined as a separation space between the housing plate 510 and a rear surface of the display module 100 separated from the housing plate 510, based on a height of the housing side wall 530. Therefore, the air gap AG may provide a space which enables the display module 100 to move in an up and down direction Z by a touch pressure of a user, and thus, the cover window 300 and the display module 100 may be deformed to a curved shape according to the touch pressure of the user.

The housing side wall 530 may include a groove 550 provided in an upper inner surface thereof, and an elastic member 570 may be installed in the groove 550.

The elastic member 570 may be attached to the groove 550 and may be disposed between a rear edge of the cover window 300 and a floor of the groove 500, thereby enabling the cover window 300 to move in the up and down direction Z according to the touch pressure of the user. The elastic member 570 according to an embodiment may include an elastic pad having an elastic restoring force, a double-sided adhesive foam pad, or a spring. In this manner, the cover window 300 may be coupled to the elastic member 570 disposed in the groove 550 of the housing side wall 530 to cover a space between the display module 100 and the housing side wall 530 and the entire front surface of the display module 100, thereby protecting the display module 100 from an impact and preventing a foreign material from penetrating into the space between the display module 100 and the housing side wall 530.

Figure 5:
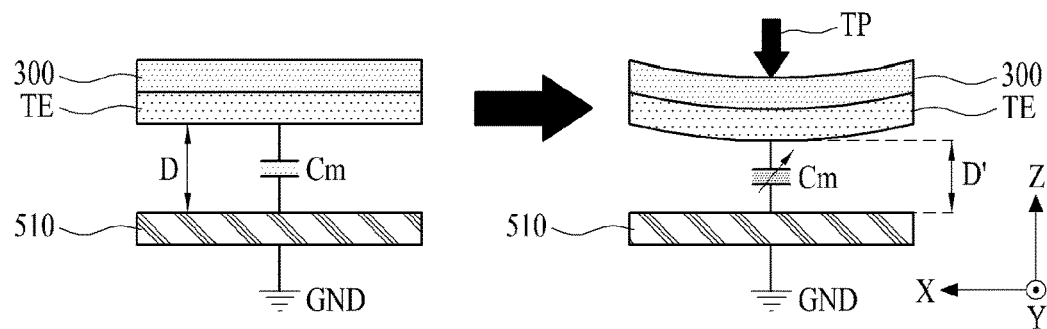
FIG. 5 is a diagram for describing a variation of a capacitance caused by a touch pressure in an electronic device according to an embodiment.

Since the housing 500 may include a conductive material, a touch sensor (i.e., a capacitor Cm) for sensing the force touch of the user may be provided between the touch electrode TE and the housing plate 510. The capacitor Cm, as illustrated in FIG. 5, may linearly increase as a distance D between the touch electrode TE and the housing plate 510 is reduced. That is, since a capacitance variation of the capacitor Cm is inversely proportional to a distance variation D', as the display panel 110 is bent according to a touch pressure TP applied to the cover window 300 and becomes closer to the housing plate 510, a distance D' between the touch electrode TE and the housing plate 510 may be reduced, and thus, the capacitance variation of the capacitor Cm may increase. Therefore, in order to enhance a sensing sensitivity of a force touch, a separation distance between the rear surface of the display module 100 and the housing plate 510 may be adjusted to at least 500 μm or more in a state where the touch pressure TP is not applied to the cover window 300. Here, in a case where the separation distance between the rear surface of the display module 100 and the housing plate 510 is less than 500 μm, since the capacitance variation of the capacitor Cm is very small with changes in the touch pressure TP, the capacitance variation of the capacitor Cm is very small when the touch pressure TP is relatively strong, and for this reason, it is difficult to differentiate the touch pressure TP, causing a reduction in a sensing sensitivity of a force touch.

The buffering member 700 may be disposed in the housing plate 510 and may be spaced apart from the rear surface of the display module 100. That is, the buffering member 700 may be attached to a front surface of the housing plate 510 and may be opposite to the rear surface of the display module 100 with the air gap AG therebetween. When the display module 100 is deformed, the buffering member 700 prevents the rear surface of the display module 100 from being damaged by a physical contact between the display module 100 and the housing plate 510. In other words, the buffering member 700 may absorb an impact applied from the housing plate 510 to the rear surface of the display module 100, thereby preventing damage of the display module 100. To this end, the buffering member 700 according to an embodiment may include a soft material, for example, polyurethane (PU).

The driving circuit unit 900 may be connected to the pad part provided on the lower substrate 113 and may time-divisionally drive the display panel 110 in the display mode and the touch sensing mode. In the display mode, the driving circuit unit 900 may display an image on the display panel 110. Also, in the touch sensing mode, the driving circuit unit 900 may sense a user touch and/or a force touch through the touch electrode TE to calculate at least one of a touch position and a touch force level, and may execute an application corresponding to the calculated touch position and/or touch force level. For example, the driving circuit unit 900 may sense a capacitance variation of the touch electrode TE caused by a user touch performed by a user finger or a conductive object to calculate at least one of a touch position and a touch force level. As another example, the driving circuit unit 900 may sense a capacitance variation of the capacitor Cm between the touch electrode TE and the housing 500 caused by a user touch performed by a user finger or a conductive object to calculate a touch force level, or may additionally calculate a touch position from a position of the touch electrode TE corresponding to the touch force level.

The driving circuit unit 900 according to an embodiment may include a host controller 910, a touch driver 930, a load free signal generator 950, and a panel driver 970.

Figure 6:
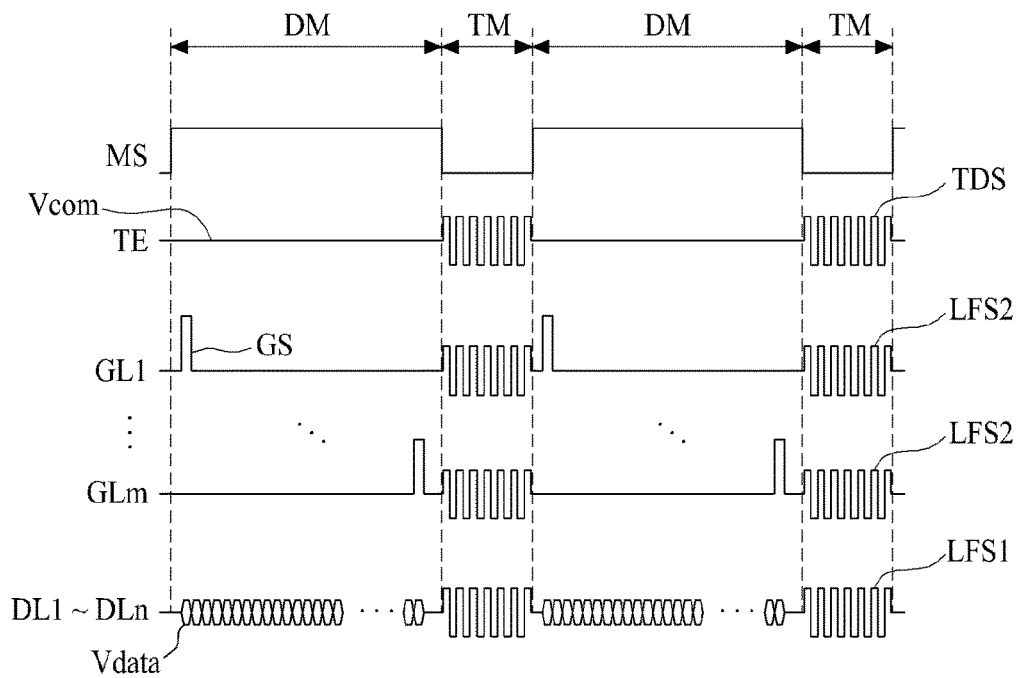
FIG. 6 is a driving waveform diagram of an electronic device according to an embodiment.

The host controller 910 may be a micro controller unit (MCU), and as illustrated in FIG. 6, the host controller 910 may drive the display panel 110 in a display mode DM and a touch sensing mode TM. That is, the host controller 910 may generate a mode signal MS having a first logic state for driving the display panel 110 in the display mode DM and a mode signal MS having a second logic state for driving the display panel 110 in the touch sensing mode TM. For example, the host controller 910 may temporally divide each frame of the display panel 110 into at least one sub-frame, based on a frame synchronization signal (or a vertical synchronization signal) of the display panel 110 and may generate the mode signal for driving the sub-frame in the display mode DM and the touch sensing mode TM. In this case, an image corresponding to one frame may be divided to correspond to the number of sub-frames and may be divisionally displayed on at least one sub-frame. Also, during the touch sensing mode of each sub-frame, touch sensing may be performed on at least one touch electrode TE based on the number of sub-frames, or touch sensing may be performed on all touch electrodes TE.

In the display mode DM, the host controller 910 may generate a mode control signal MS having the first logic state, digital image data, and a timing synchronization signal to supply the mode control signal MS, the digital image data, and the timing synchronization signal to the touch driver 930, the load free signal generator 950, and the panel driver 970.

In the touch sensing mode TM, the host controller 910 may generate a mode control signal MS having the second logic state to supply the mode control signal MS to the touch driver 930, the load free signal generator 950, and the panel driver 970.

In the touch sensing mode TM, the host controller 910 may calculate at least one of a touch position and a touch force level, based on touch raw data supplied from the touch driver 930 and may execute an application corresponding to at least one of the touch position and the touch force level. Here, the application may include a touch position-based application program and a touch force-based application program which are installed in the electrode device. The touch position-based application program may be an application program corresponding to a program icon displayed at a touch position. The touch force-based application program may be a security application program for performing a lock function or an unlock function or an application program corresponding to a force level which is set in the program icon displayed at the touch position.

In detail, in the touch sensing mode TM, the host controller 910 may compare reference raw data with touch raw data supplied from the touch driver 930 to calculate a touch position or calculate the touch position and a touch force level.

For example, as a touch pressure increases, a capacitance of the capacitor Cm provided between the touch electrode TE and the housing plate 510 may linearly increase, and thus, when a force touch of a user is made, touch raw data may have a value higher than a value which is generated when a simple touch of the user is made. Therefore, the host controller 910 may differentiate and calculate a touch position and a touch force level by using the touch raw data, based on the reference raw data. For example, the host controller 910 may classify touch raw data less than the reference raw data as touch position sensing touch raw data and may classify touch raw data more than the reference raw data as touch force sensing touch raw data, based on the reference raw data. Therefore, the host controller 910 according to an embodiment may calculate a touch position, based on the touch raw data less than the reference raw data, and in this case, the host controller 910 may calculate the touch position (or two-dimensional (2D) touch information) by using a position of a touch electrode having the touch raw data less than the reference raw data. Also, the host controller 910 may calculate a touch force level or/and a touch position, based on the touch raw data more than the reference raw data, and in this case, the host controller 910 may calculate the touch force level corresponding to the touch raw data more than the reference raw data or may calculate the touch force level and three-dimensional (3D) touch information including the touch position by using a position of a touch electrode having the touch raw data more than the reference raw data.

In other embodiments, the host controller 910 may calculate a touch position and a touch force level by using touch raw data without using the reference raw data. However, in order to prevent power consumption caused by an undesired operation of calculating a touch force level in a simple position touch instead of a force touch based on a touch pressure which is intentionally applied by a user, the host controller 910 may differentiate the simple position touch and the force touch by using the reference raw data and may calculate the touch position and the touch force level.

The touch driver 930 may supply a common voltage Vcom to a plurality of touch electrodes TE through a plurality of touch routing lines TL during the display mode DM in response to the mode signal MS having the first logic state which is supplied from the host controller 910. That is, in order for each of the plurality of touch electrodes TE to be used as the common electrode, the touch driver 930 may supply the common voltage Vcom to each of the plurality of touch electrodes TE during the display mode DM based on the mode signal MS having the first logic state.

The touch driver 930 may individually supply a touch driving signal TDS to the plurality of touch electrodes TE through the plurality of touch routing lines TL during the touch sensing mode TM in response to the mode signal MS having the second logic state which is supplied from the host controller 910, sense a capacitance variation caused by a user touch of touch electrodes TE to which the touch driving signal TDS was applied through each of the plurality of touch routing lines TL to generate touch raw data, and supply the touch raw data to the host controller 910. Here, the touch driver 930 may sense a self-capacitance variation of the touch electrode TE through a capacitive sensing circuit to generate the touch raw data.

The touch raw data may have a large data value as a touch pressure increases according to a capacitance variation of the capacitor Cm provided between the touch electrode TE and the housing plate 510, in addition to a variation of a self-capacitance which occurs in the touch electrode TE when a touch pressure of a user is applied by a user finger or a separate touch instrument. For example, the touch driver 930 may generate touch raw data corresponding to a self-capacitance variation of the touch electrode TE caused by a user touch which is made by the user finger or a conductive object. As another example, the touch driver 930 may generate touch raw data corresponding to the capacitance variation of the capacitor Cm provided between the touch electrode TE and the housing plate 510, in addition to a variation of a self-capacitance which occurs in the touch electrode TE when the user touch is made by the user finger or a non-conductive object.

The touch driving signal TDS may be selected from among an alternating current (AC) driving waveform, a direct current (DC) driving voltage, and a ground voltage, based on a charged amount, a circuit configuration, consumption power, and/or the like. Here, the AC driving waveform may include a pulse wave, a sine wave, an attenuation sine wave, a square wave, a rectangular wave, a sawtooth waveform, a triangular wave, or a step wave.

The touch driver 930 may sense a self-capacitance variation of the touch electrode TE caused by a user touch. In self-capacitive touch sensing, the touch driver 930 may apply the touch driving signal TDS to the touch electrode TE through the touch routing line TL and then may again sense the self-capacitance variation of the touch electrode TE to which the touch driving signal TDS was applied, through the touch routing line TL, and in this case, as the touch electrode TE overlaps the gate line GL and the data line DL, a parasitic capacitance may be generated between the touch electrode TE and the gate line GL or the data line DL and may act as a large load in touch driving, thereby decreasing an accuracy of touch sensing or disallowing touch sensing to be performed. In order to solve such a problem, in the touch sensing mode TM, the load free signal generator 950 may generate a plurality of load free signals LFS1 and LFS2 having the same phase and potential difference as those of the touch driving signal TDS in response to the mode signal MS having the second logic state which is supplied from the host controller 910 and may supply the load free signals LFS1 and LFS2 to the panel driver 970. That is, the load free signal generator 950 may generate the load free signals LFS1 and LFS2 having the same phase and potential difference as those of the touch driving signal TDS and may simultaneously supply the load free signals LFS1 and LFS2 to the gate lines GL1 to GLm and the data lines DL1 to DLn, thereby decreasing a load of the touch electrode TE caused by the parasitic capacitance between the touch electrode TE and the gate line GL or the data line DL. In this manner, when the load free signals LFS1 and LFS2 are simultaneously applied to the touch electrode TE, the gate line GL, and the data line DL, a potential difference does not occur between the touch electrode TE and the gate lines GL1 to GLm or the data lines DL1 to DLn, and thus, a parasitic capacitance is not generated between the touch electrode TE and the gate lines GL1 to GLm or the data lines DL1 to DLn. Accordingly, in the present embodiment, a sensitivity of touch position sensing and a sensitivity of force touch sensing are enhanced.

The load free signal generator 950 according to an embodiment may generate a first load free signal LFS1 and a second load free signal LFS2 which have the same phase as that of the touch driving signal TDS and have a voltage swing width which swings based on the same voltage difference, and may supply the first load free signal LFS1 and the second load free signal LFS2 to the panel driver 970. The first load free signal LFS1 may be supplied to the data line DL through the panel driver 970, and the second load free signal LFS2 may be supplied to the gate line GL through the panel driver 970.

The first load free signal LFS1 according to an embodiment may have a first voltage swing width between a first high voltage and a first low voltage.

The second load free signal LFS2 according to an embodiment may have the same phase as that of the first load free signal LFS1 and may have the first voltage swing width between a second high voltage and a second low voltage. In this case, the first high voltage may be adjusted higher than the second high voltage, and the first low voltage may be adjusted higher than the second low voltage. Particularly, the second high voltage of the second load free signal LFS2 may be adjusted to a voltage level lower than a gate high voltage of a gate signal supplied to the gate line GL for turning on a TFT in the display mode. This is for preventing the TFT from being turned on by the second load free signal LFS2 supplied to the gate line GL in the touch sensing mode. Also, the second low voltage of the second load free signal LFS2 may be adjusted to a voltage level which is the first voltage swing width lower than the second high voltage, and thus, the second load free signal LFS2 may have the same phase and voltage swing width as those of the first load free signal LFS1.

The panel driver 970 may generate a gate signal GS during display mode DM to supply the gate signal GS to a corresponding gate line GL, based on the mode signal MS having the first logic state, the digital image data, and the timing synchronization signal supplied from the host controller 910 and may digital-to-analog convert the digital image data corresponding to each subpixel to generate an analog data voltage signal Vdata and supply the data voltage signal Vdata to a corresponding data line DL in synchronization with the supply of the gate signal GS, thereby driving liquid crystal by using an electric field generated from the data signal and the common voltage Vcom to display an image on the display panel 110. Here, in a case where a built-in gate driving circuit unit is provided on the lower substrate 111 of the display panel 110, the panel driver 970 may generate the gate control signal to supply the gate control signal to the built-in gate driving circuit unit, based on the timing synchronization signal, and the built-in gate driving circuit unit may generate the gate signal GS to supply the gate signal GS to the gate lines GL1 to GLm according to the gate control signal.

The panel driver 970 may supply the first load free signal LFS1 and the second load free signal LFS2, supplied from the load free signal generator 950, to the display panel 110 according to the mode signal MS having the second logic state which is supplied from the host controller 910, thereby reducing a load of the touch electrode TE. That is, the panel driver 970 may receive the first load free signal LFS1 and the second load free signal LFS2 supplied from the load free signal generator 950, supply the first load free signal LFS1 to the data lines DL1 to DLn, and supply the second load free signal LFS2 to the gate lines GL1 to GLm in synchronization with the supply of the first load free signal LFS1. Here, in a case where the built-in gate driving circuit unit is provided on the lower substrate 111 of the display panel 110, the second load free signal LFS2 may be supplied to the built-in gate driving circuit unit through the panel driver 970 or may be directly supplied from the load free signal generator 950 to the built-in gate driving circuit unit. In this case, the built-in gate driving circuit unit may supply the second load free signal LFS2, transferred from the panel driver 970 or directly supplied from the load free signal generator 950, to the gate lines GL1 to GLm.

In the driving circuit unit 900 according to an embodiment, each of the host controller 910, the touch driver 930, the load free signal generator 950, and the panel driver 970 may be implemented as a separate integrated circuit (IC). Also, the host controller 910, the touch driver 930, and the panel driver 970 may be implemented as one IC. Also, the touch driver 930 and the panel driver 970 may be implemented as one IC. Also, the touch driver 930 may be built into the host controller 910. Also, the load free signal generator 950 may be built into one of the host controller 910, the touch driver 930, and the panel driver 970.

Figure 7:
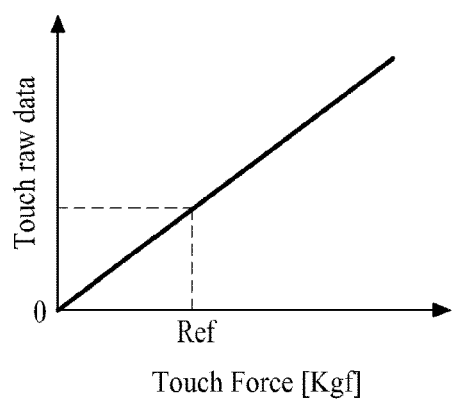
FIG. 7 is a diagram for describing a change in touch raw data caused by a touch force in an electronic device according to an embodiment.

FIG. 7 is a diagram for describing a change in touch raw data caused by a touch force in an electronic device according to an embodiment.

Referring to FIGS. 3, 5 and 7, the housing plate 510 of the housing 500 according to the present embodiment may be electrically grounded (GND), and thus, when a touch pressure (or a touch force) of a user is applied, the capacitor Cm may be provided between the touch electrode TE and the housing plate 510. As the touch pressure increases, the distance D between the touch electrode TE and the housing plate 510 may be reduced, and thus, an electric charge of the capacitor Cm may linearly increase.

As seen in FIG. 7, as a touch pressure increases, a value of touch raw data generated by the touch driver 930 may linearly increase, and thus, as in FIG. 5, it can be seen that as the touch pressure increases, the distance D' between the touch electrode TE and the housing plate 510 is reduced, and thus, a capacitance of the capacitor Cm provided between the touch electrode TE and the housing plate 510 varies largely.

Therefore, the host controller 910 may calculate a touch force level based on a value of touch raw data, based on a touch pressure-based touch force level which is incrementally set according to a level of the touch pressure.

In the present embodiment, the housing 500 may be formed of a conductive material and may be electrically grounded (GND). When a user touch is applied, a touch position and/or a touch force may be sensed from an amount of change in the capacitance Cm based on the distance variation D' between the touch electrode TE and the housing plate 510, and particularly, a force touch of a user may be sensed by using the housing plate 510 and the touch electrode TE for touch position sensing even without a separate force sensing panel.

Figure 8:
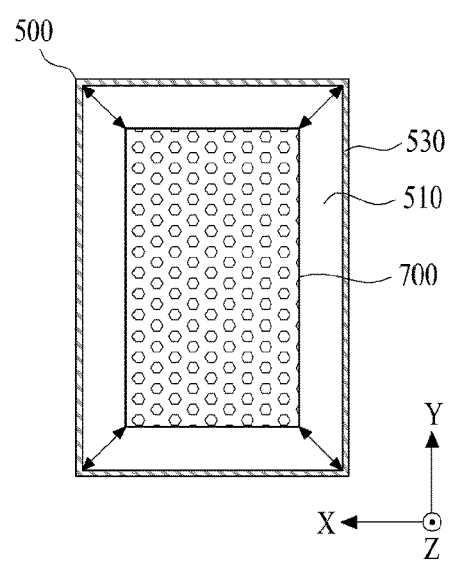
FIG. 8 is a plan view for describing a buffering member illustrated in FIG. 2.

FIG. 8 is a plan view for describing the buffering member 700 illustrated in FIG. 2.

Referring to FIGS. 2 and 8, the buffering member 700 according to the present embodiment may be provided to overlap a portion other than a rear edge of the display module 100. That is, the buffering member 700 may have a tetragonal cross-sectional surface which is the same as that of the housing plate 510, may be provided to have a size smaller than that of the housing plate 510, and may be attached to a portion other than an edge of the housing plate 510. Here, the buffering member 700 comprises a tetragonal cross-sectional shape centered around a center of the display module 100. Therefore, each of side surfaces of the buffering member 700 may be spaced apart from the housing side wall 530 of the housing 500, and thus, the edge of the housing plate 510 may be directly opposite to the rear edge of the display module 100 without being covered by the buffering member 700. For example, the buffering member 700 may have a size which does not overlap a bottom of the guide frame 150 supporting the display panel 110.

The buffering member 700 according to the present embodiment prevents the display module 100 from being damaged by physical contact between the display module 100 and the housing plate 510 and increases a touch sensitivity corresponding to the edge of the display module 100.

In detail, the display module 100 may be deformed to a concave shape by a touch pressure of a user, and in this case, a deformation rate of the display module 100 may increase in a direction from the edge to a center portion of the display module 100 supported by the housing side wall 530. That is, the center portion of the display module 100 may be spaced apart from the housing side wall 530, and thus, may have a first deformation distance capable of contacting the buffering member 700 according to a touch pressure. On the other hand, the edge of the display module 100 may be adjacent to the housing side wall 530, and thus, may have a second deformation distance which is smaller than the first deformation distance of the center portion when the same touch pressure is applied. When the same touch pressure is applied to the edge and the center portion of the display module 100, a touch sensitivity deviation occurs due to a deviation between the first deformation distance and the second deformation distance. In order to compensate for the touch sensitivity deviation, in the present embodiment, the buffering member 700 may be disposed to overlap a portion other than the rear edge of the display module 100, and thus, the second deformation distance of the edge of the display module 100 may increase by a thickness of the buffering member 700, thereby compensating for a reduction in touch sensitivity corresponding to the edge of the display module 100.

Figure 9:
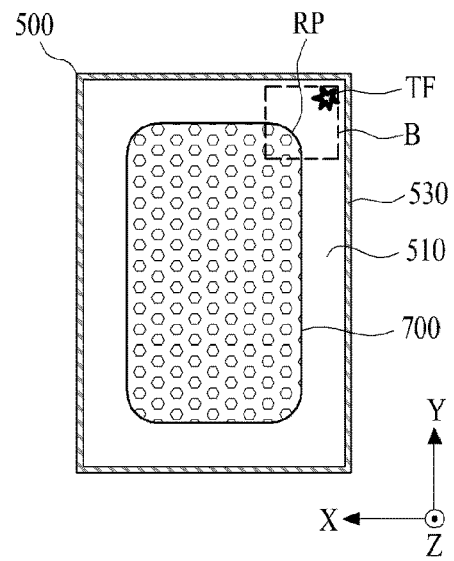
FIG. 9 is a plan view for describing an example of the buffering member illustrated in FIG. 8.

In addition, as illustrated in FIG. 9, one or more corners of the tetragonal cross-sectional shape of the buffering member 700 according to the present embodiment may be rounded (RP) in a curved shape. That is, each of corners of the edge of the display module 100 may be the smallest deformed by a user touch pressure, and thus, in order to additionally compensate for a reduction in a touch sensitivity corresponding to a corner of the display module 100, each of the corners of the buffering member 700 may be rounded (RP) in a curved shape.

Figure 10:
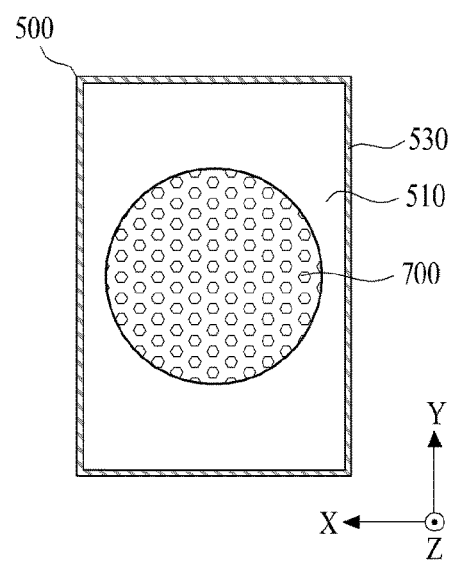
FIG. 10 is a plan view for describing another example of the buffering member illustrated in FIG. 8.

Also, as illustrated in FIG. 10, the buffering member 700 according to the present embodiment may have a circular cross-sectional surface. A center portion of the buffering member 700 having a circular shape may overlap the center portion of the display module 100. Here, the buffering member 700 comprises a circular cross-sectional shape centered around a center of the display module 100. The buffering member 700 having a circular shape may increase the second deformation distance of the edge of the display module 100 by a thickness of the buffering member 700, thereby compensating for a reduction in a touch sensitivity corresponding to the edge of the display module 100, and particularly, additionally compensating for a reduction in a reduction in a touch sensitivity corresponding to the corner of the display module 100.

FIGS. 11A and 11B are diagrams for describing a simulation result obtained by experimenting on a touch sensitivity based on a touch pressure in an electronic device according to an embodiment. The simulation result shows touch raw data based on a simple position touch, which is made by a conductive object or a conductive tip having a diameter of 2 mm, and touch raw data based on a force touch.

As seen in FIG. 11A, when pressure is not applied by the conductive object (for example, a soft touch), touch raw data has been measured as "105". On the other hand, as seen in FIG. 11B, when pressure is applied by the conductive object (for example, a hard touch), the touch raw data has been measured as "210".

Therefore, in the present embodiment, the force touch may be sensed from the touch raw data based on the touch pressure.

FIGS. 12A and 12B are diagrams for describing a simulation result obtained by experimenting on touch sensitivity in an embodiment of the present invention and a comparative example. The simulation result shows touch raw data according to an embodiment of the present invention and touch raw data according to the comparative example when a touch force is applied to the corner of the display module by using a finger.

FIG. 12A shows the comparative example in which the buffering member is provided all over the housing plate 510, and in this case, FIG. 12A shows touch raw data measured by applying a touch force TF to a corner B of the display module of FIG. 9 with a finger. FIG. 12B shows an embodiment of the present invention. The buffering member is provided in a portion other than the edge of the housing plate 510, and in this case, FIG. 12B shows touch raw data measured by applying the touch force TF to the corner B of the display module of FIG. 9 with a finger.

As seen in FIG. 12A, touch raw data according to the comparative example has been measured as "527". On the other hand, as seen in FIG. 12B, the touch raw data according to an embodiment of the present invention has been measured as "582".

Therefore, in the present embodiment, a reduction in touch sensitivity in the corner B of the display module is minimized by removing the edge of the buffering member provided in the edge of the housing plate 510.

Figures 13, 14A:
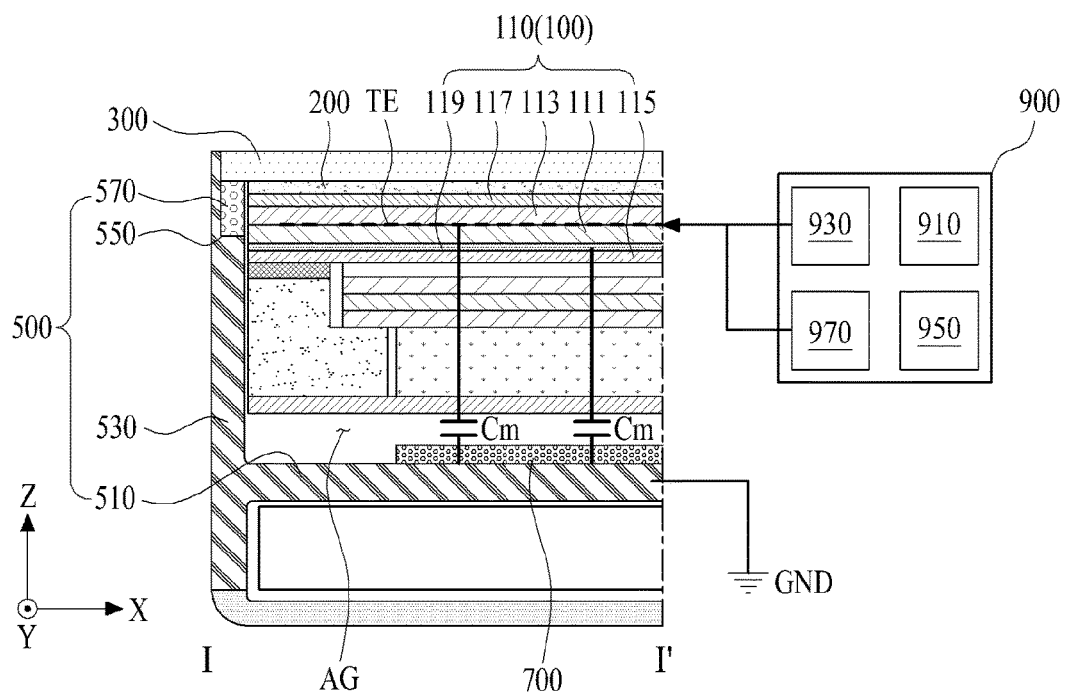
FIG. 13 is another cross-sectional view taken along line I-I' illustrated in FIG. 1.
FIGS. 14A and 14B are diagrams for describing a simulation result obtained by experimenting on a touch sensitivity based on a touch pressure in an electronic device according to an embodiment.

FIG. 13 is another cross-sectional view taken along line I-I' illustrated in FIG. 1 and illustrates a transparent conductive layer which is additionally provided in the display panel illustrated in FIGS. 2 to 10. Hereinafter, therefore, the transparent conductive layer and elements relevant thereto will be described, and descriptions on the other elements are not repeated.

Referring to FIG. 13, the display panel 110 according to the present invention may further include a transparent conductive layer 119.

The transparent conductive layer 119 may be provided between the lower polarizing member 115 and the lower substrate 111 of the display panel 110. That is, the transparent conductive layer 119 may be provided all over a rear surface of the lower substrate 111 facing the housing plate 510. The transparent conductive layer 119 may be electrically floated. Since the transparent conductive layer 119 is electrically floated, the transparent conductive layer 119 may act as a touch electrode for sensing a force touch along with the touch electrode TE. Therefore, the distance between the touch electrode TE and the housing plate 510 may be reduced due to the transparent conductive layer 119, and thus, a relatively high capacitance of the capacitance Cm may be generated between the touch electrode TE and the housing plate 510. Therefore, in the present embodiment, when the same touch pressure is applied, the distance between the touch electrode TE and the housing plate 510 may be further reduced due to the transparent conductive layer 119, and thus, an electric charge of the capacitance Cm may further increase. Accordingly, a touch force level is efficiently classified based on the touch pressure, and thus, a force touch sensitivity is enhanced.

In addition, the transparent conductive layer 119 may be disposed between the touch electrode TE and the housing plate 510 and may be electrically floated, and thus, a fringing field generated near the touch electrode TE may be offset by a touch performed by a user finger or a conductive object, whereby a capacitance variation of the capacitance Cm provided between the touch electrode TE and the housing plate 510 is effectively sensed. Also, the transparent conductive layer 119 may act as a noise blocking layer that prevents static electricity or frequency noise, occurring in the driving circuit unit 900 accommodated into the housing 500, from flowing into the display panel 110.

Figures 14B, 15:
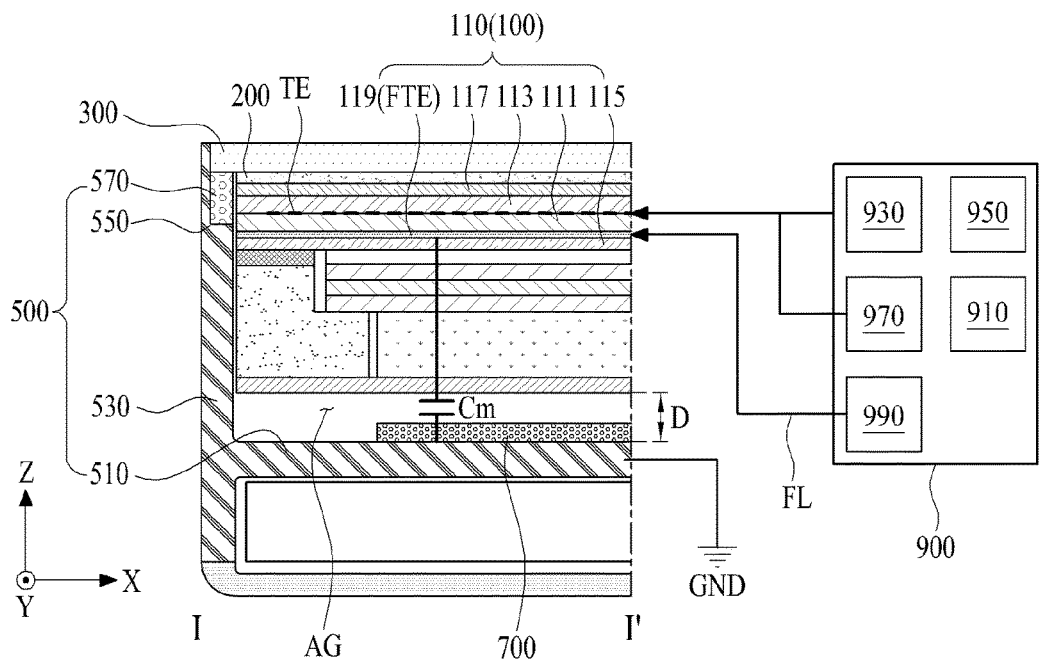
FIG. 15 is another cross-sectional view taken along line I-I' illustrated in FIG. 1.

FIGS. 14A and 14B are diagrams for describing a simulation result obtained by experimenting on a touch sensitivity based on a touch pressure in an electronic device according to an embodiment employing the transparent conductive layer 119. The simulation result shows touch raw data based on a simple position touch, which is made by a conductive object or a conductive tip having a diameter of 2 mm, and touch raw data based on a force touch.

As seen in FIG. 14A, when pressure is not applied by the conductive object (for example, a soft touch), touch raw data has been measured as "115". On the other hand, as seen in FIG. 14B, when pressure is applied by the conductive object (for example, a hard touch), the touch raw data has been measured as "357". Therefore, in an embodiment of the present invention, it can be seen that the distance between the touch electrode TE and the housing plate 510 may be further reduced due to the transparent conductive layer 119 which is electrically floated between the touch electrode TE and the housing plate 510, and thus, a value of the touch raw data increases by three times.

Therefore, in the present embodiment, since the transparent conductive layer 119 is further provided, a touch force level is efficiently classified based on the touch pressure, and thus, a force touch sensitivity is enhanced.

Figure 16:
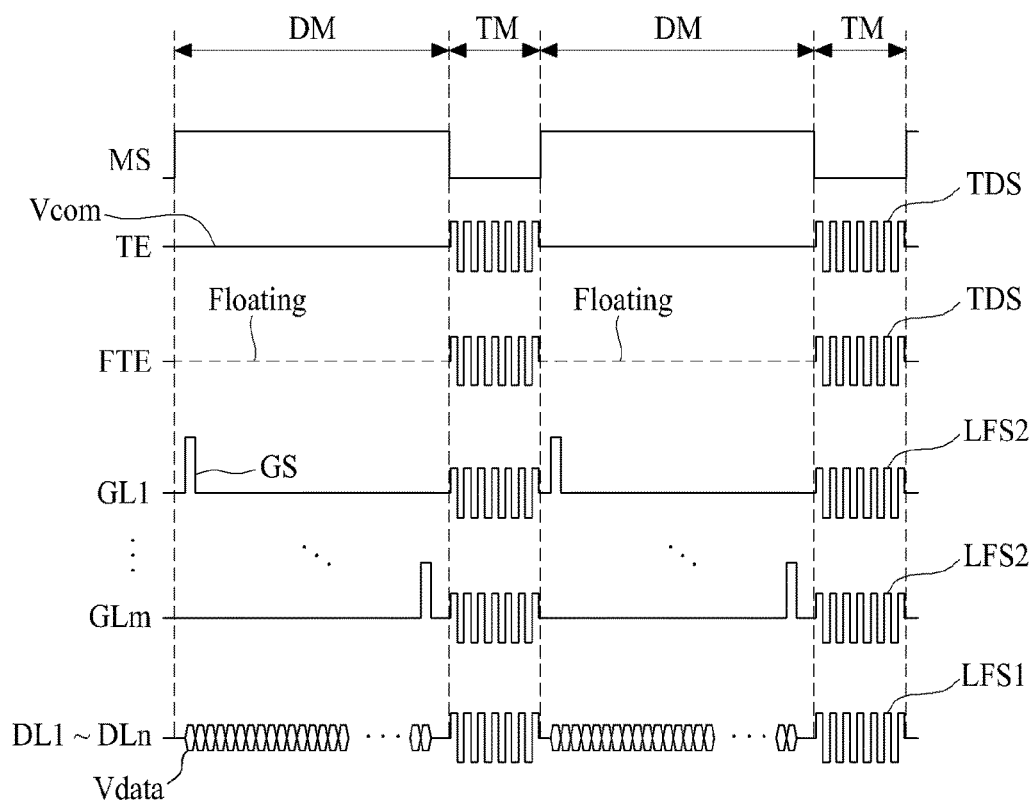
FIG. 16 is a driving waveform diagram of an electronic device illustrated in FIG. 15.

FIG. 15 is another cross-sectional view taken along line I-I' illustrated in FIG. 1, and FIG. 16 is a driving waveform diagram of an electronic device illustrated in FIG. 15. The drawings illustrate a configuration where the transparent conductive layer of the display panel illustrated in FIG. 13 is connected to the panel driver. Hereinafter, therefore, the driving circuit unit connected to the transparent conductive layer will be described, and descriptions on the other elements are not repeated.

Referring to FIGS. 15 and 16, in an electronic device according to the present embodiment, a touch sensor provided in a display module 100 may include a touch electrode TE, which is built into a display panel 110 and is used as a common electrode, and a force touch electrode FTE which includes a transparent conductive layer 119 provided in the display panel 110. Here, the transparent conductive layer 119 provided in the display panel 110 may be connected to a driving circuit unit 900 and thus may be used as the force touch electrode FTE. Therefore, the driving circuit unit 900 according to the present embodiment may sense a force touch based on a user touch by using the transparent conductive layer 119 provided in the display module 100, namely, on the rear surface of the display panel 110. Hereinafter, therefore, the transparent conductive layer 119 provided on the rear surface of the display panel 110 may be defined as the force touch electrode FTE.

The driving circuit unit 900 according to an embodiment may sense a touch position of a user through the touch electrode TE in the touch sensing mode TM between adjacent display modes DM, and simultaneously, may sense a force touch of the user through the force touch electrode FTE. In the touch sensing mode TM, when a user touch is made by a user finger or a conductive object, the driving circuit unit 900 according to an embodiment may sense a capacitance variation of the touch electrode TE to calculate a touch position, and simultaneously, may sense a capacitance variation of a capacitor Cm between the force touch electrode FTE and a housing 500 to calculate a touch force level.

The driving circuit unit 900 according to an embodiment may include a host controller 910, a touch driver 930, a load free signal generator 950, a panel driver 970, and a force touch driver 990. Except that the driving circuit unit 900 having such a configuration further includes the force touch driver 990, the driving circuit unit 900 according to the present embodiment is the same as the driving circuit unit illustrated in FIG. 13. Hereinafter, therefore, the force touch driver 990 will be described in detail, and elements relevant to the touch driver 990 will be briefly described.

The host controller 910 may be an MCU and may drive the display panel 110 in the display mode DM and the touch sensing mode TM. That is, the host controller 910 may generate a mode signal MS having a first logic state for driving the display panel 110 in the display mode DM and a mode signal MS having a second logic state for driving the display panel 110 in the touch sensing mode TM.

In the touch sensing mode TM, the host controller 910 may calculate a touch position based on touch raw data supplied from the touch driver 930, calculate a touch force level based on force raw data supplied from the force touch driver 990, and may execute an application corresponding to at least one of the touch position and the touch force level.

In detail, in the touch sensing mode TM, the host controller 910 may receive the touch raw data supplied from the touch driver 930 and may compare reference raw data with the received touch raw data to calculate a touch position. For example, the host controller 910 may calculate a touch position, based on the touch raw data more than the reference raw data, and in this case, the host controller 910 may calculate the touch position (or 2D touch information) by using a position of a touch electrode having the touch raw data more than the reference raw data. Simultaneously, the host controller 910 may receive the force raw data supplied from the force touch driver 990 and may compare reference raw data with the received force raw data to calculate a touch force level. For example, the host controller 910 may calculate a touch force level based on a value of the force raw data, based on a touch pressure-based touch force level which is incrementally set according to a level of a touch pressure. Also, the host controller 910 may execute an application corresponding to at least one of the calculated touch position and touch force level.

The touch driver 930 may supply a common voltage Vcom to a plurality of touch electrodes TE through a plurality of touch routing lines TL during the display mode DM in response to the mode signal MS having the first logic state which is supplied from the host controller 910.

The touch driver 930 may individually supply a touch driving signal TDS to the plurality of touch electrodes TE through the plurality of touch routing lines TL during the touch sensing mode TM in response to the mode signal MS having the second logic state which is supplied from the host controller 910, sense a self-capacitance variation of a touch electrodes TE caused by a user touch through each of the plurality of touch routing lines TL to generate touch raw data, and supply the touch raw data to the host controller 910.

In the touch sensing mode TM, the load free signal generator 950 may generate a first load free signal LFS1 and a second load free signal LFS2 which have the same phase and potential difference as those of the touch driving signal TDS, in response to the mode signal MS having the second logic state which is supplied from the host controller 910. Also, the load free signal generator 950 may supply the first load free signal LFS1 to a data line DL, and simultaneously, may supply the second load free signal LFS2 to a gate line GL.

The panel driver 970 may generate a gate signal GS during display mode DM to supply the gate signal GS to a corresponding gate line GL, based on the mode signal MS having the first logic state, digital image data, and a timing synchronization signal supplied from the host controller 910 and may digital-to-analog convert the digital image data corresponding to each subpixel to generate an analog data voltage signal Vdata and supply the data signal Vdata to a corresponding data line DL in synchronization with the supply of the gate signal GS, thereby driving liquid crystal by using an electric field generated from the data signal and the common voltage Vcom to display an image on the display panel 110.

During the touch sensing mode TM, based on the mode signal MS having the second logic state which is supplied from the host controller 910, the panel driver 970 may receive the first load free signal LFS1 and the second load free signal LFS2 supplied from the load free signal generator 950, supply the first load free signal LFS1 to the data lines DL1 to DLn, and supply the second load free signal LFS2 to the gate lines GL1 to GLm in synchronization with the supply of the first load free signal LFS1.

In response to the mode signal MS supplied from the host controller 910, the force touch driver 990 may electrically change the force touch electrode FTE to a high impedance state during the display mode DM, and during the touch sensing mode TM, the host controller 910 may sense a capacitance variation of the capacitor Cm between the force touch electrode FTE and the housing 500 to generate force raw data and may supply the force raw data to the host controller 910.

In response to the mode signal MS having the first logic state which is supplied from the host controller 910, the force touch driver 990 may electrically change the force touch electrode FTE to the high impedance state through a force routing line FL during the display mode DM. That is, the force touch driver 990 may electrically float the force touch electrode FTE during the display mode DM. Therefore, the force touch electrode FTE may be electrically floated and thus may act as a noise blocking layer that prevents static electricity or frequency noise, occurring in the driving circuit unit 900 accommodated into the housing 500, from affecting the display panel 110.

In response to the mode signal MS having the second logic state which is supplied from the host controller 910, during the touch sensing mode TM, the force touch driver 990 may sense a capacitance variation of the capacitor Cm between the force touch electrode FTE and the housing 500 to generate force raw data and may supply the force raw data to the host controller 910. That is, the force touch driver 990 may supply the touch driving signal TDS to the force touch electrode FTE through the force routing line FL during the touch sensing mode TM, again sense the capacitance variation of the capacitor Cm between the force touch electrode FTE and the housing 500 through the force routing line FL to generate the force raw data, and may supply the force raw data to the host controller 910. In this case, when a force touch of a user is made, a fringing field generated near the touch electrode TE is weakened in a direction from the touch electrode TE to the housing plate 510 which is grounded (GND) and is offset by the touch driving signal TDS applied to the force touch electrode FTE, and thus, does not affect the capacitance variation of the capacitor Cm provided between the force touch electrode FTE and the housing 500. In one embodiment, the touch driving signal TDS provided by the force touch driver 990 to the force touch electrode FTE may be same as the touch driving signal TDS provided by the touch driver 930 to the touch electrodes TE. In other embodiments, the force touch driver 990 may apply a force touch driving signal that is different from the touch driving signal TDS provided by the touch driver 930 to the touch electrodes TE.

During the touch sensing mode TM, the electronic device according to the present embodiment may sense a self-capacitance variation of the touch electrode TE provided in the display panel 110 to calculate a touch position, and simultaneously, may sense the capacitance variation of the capacitor Cm between the housing 500 and the force touch electrode FTE provided on a rear surface of the display panel 110 to calculate a touch force level, and thus, the electronic device may separately perform touch position sensing based on the touch electrode TE and force touch sensing based on the force touch electrode FTE, thereby shortening a data processing duration.

Particularly, since the touch electrode TE for touch position sensing is separated from the force touch electrode FTE for force touch sensing, the electronic device according to the present embodiment may sense a force touch even when a touch pressure equal to or more than a threshold value is applied. For example, in touch position sensing and touch force sensing based on the same touch electrode TE, since touch raw data based on a user touch has a high value which has further increased by the capacitance variation of the capacitor Cm between the housing 500 and the force touch electrode FTE, the touch raw data based on the touch pressure equal to or more than the threshold value may be saturated to a certain value, and in this case, it is unable to differentiate the touch pressure equal to or more than the threshold value. On the other hand, in the present embodiment, since a force touch of a user is sensed through the force touch electrode FTE instead of the touch electrode TE, the force touch may be sensed even when the touch pressure equal to or more than the threshold value is applied.

Figure 17:
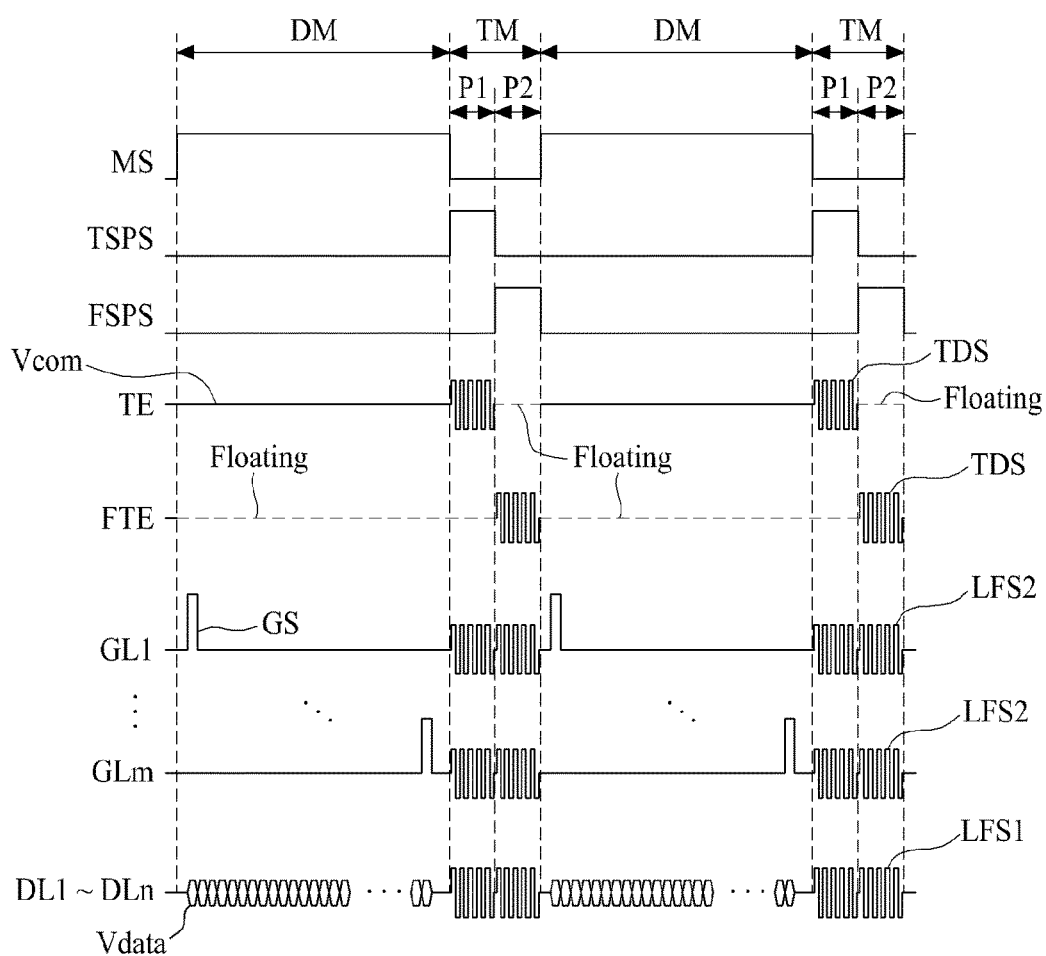
FIG. 17 is another driving waveform diagram of an electronic device illustrated in FIG. 15.

FIG. 17 is another driving waveform diagram of an electronic device illustrated in FIG. 15. Hereinafter, therefore, only a driving circuit unit relevant to the touch sensing mode will be described.

Referring to FIGS. 15 and 17, in the electronic device according to the present embodiment, the driving circuit unit 900 may temporally divide the touch sensing mode TM between adjacent display modes DM into a first touch sensing period P1 and a second touch sensing period P2 to time-divisionally drive the touch sensing mode TM in the first touch sensing period P1 and the second touch sensing period P2, thereby sensing a touch position and a force touch. Here, the first touch sensing period P1 may be defined as one period of the periods of the touch sensing mode TM, and the second touch sensing period P2 may be defined as a period other than the one period of the periods of the touch sensing mode TM. For example, in the touch sensing mode TM, the first touch sensing period P1 and the second touch sensing period P2 may have the same duration or different durations. For the first touch sensing period P1 and the second touch sensing period P2, the host controller 910 of the driving circuit unit 900 may temporally divide the mode signal MS having the second logic state to generate a touch sensing period signal TSPS and a force sensing period signal FSPS.

The touch sensing period signal TSPS may define the first touch sensing period P1 of the touch sensing mode TM and may have the first logic state in only the first touch sensing period P1. The force sensing period signal FSPS may define the second touch sensing period P2 of the touch sensing mode TM and may have the first logic state in only the second touch sensing period P2.

During the first touch sensing period P1 of the touch sensing mode TM, when a user touch is made by a user finer or a conductive object, the driving circuit unit 900 may sense a self-capacitance variation of the touch electrode TE to calculate a touch position. That is, the driving circuit unit 900 may individually supply the touch driving signal TDS to the plurality of touch electrodes TE through the plurality of touch routing lines TL and may sense a self-capacitance variation of a touch electrode TE caused by the user touch through each of the plurality of touch routing lines TL to calculate the touch position. At this time, the driving circuit unit 900 may electrically float the force touch electrode FTE during the first touch sensing period P1 of the touch sensing mode TM, thereby preventing static electricity or frequency noise, occurring in the driving circuit unit 900 accommodated into the housing 500, from flowing into the touch electrode TE. Here, the touch driver 930 may sense the self-capacitance variation of the touch electrode TE according to the touch sensing period signal TSPS which is generated in the touch sensing mode TM, and the host controller 910 may calculate the touch position. Thus, repetitive descriptions relevant thereto are omitted.

During the second touch sensing period P2 of the touch sensing mode TM, when a user touch is made, the driving circuit unit 900 may sense a capacitance variation of the capacitor Cm between the force touch electrode FTE and the housing 500 to calculate a touch force level. That is, the driving circuit unit 900 may supply the touch driving signal TDS to the force touch electrode FTE through the force routing line FL and may again sense through the force routing line FL the capacitance variation of the capacitor Cm between the force touch electrode FTE and the housing 500 caused by the user touch to calculate the touch force level. At this time, during the second touch sensing period P2 of the touch sensing mode TM, the driving circuit unit 900 may electrically float the touch electrode TE to offset a fringing field which is generated near the touch electrode TE according to the user touch, thereby enabling the capacitance variation of the capacitor Cm between the force touch electrode FTE and the housing 500 to be effectively sensed. Here, the force touch driver 990 may sense the capacitance variation of the capacitor Cm between the force touch electrode FTE and the housing 500 according to the force sensing period signal FSPS which is generated in the touch sensing mode TM, and the host controller 910 may calculate the touch force level. Thus, repetitive descriptions relevant thereto are omitted.

Optionally, during the first touch sensing period P1 of the touch sensing mode TM, the driving circuit unit 900 may sense a self-capacitance variation of the touch electrode TE to generate touch raw data and may calculate a touch position, based on the touch raw data, and then, when the touch raw data corresponding to the calculated touch position is equal to or more than a force touch reference value, during the second touch sensing period P2 of the touch sensing mode TM, the driving circuit unit 900 may sense a capacitance variation of the capacitor Cm between the force touch electrode FTE and the housing 500 to calculate a touch force level. That is, the driving circuit unit 900 may determine whether a force touch is a force touch desired by a user, based on the touch raw data which is sensed during the first touch sensing period P1. Only when it is determined that the force touch is the force touch desired by the user, the driving circuit unit 900 may sense the force touch during the second touch sensing period P2.

During the touch sensing mode TM, the electronic device according to the present embodiment may sense a self-capacitance variation of the touch electrode TE provided in the display panel 110 through time-divisional driving to calculate a touch position, and simultaneously, may sense the capacitance variation of the capacitor Cm between the housing 500 and the force touch electrode FTE provided on a rear surface of the display panel 110 to calculate a touch force level, thereby shortening a data processing duration for which touch position sensing based on the touch electrode TE and force touch sensing based on the force touch electrode FTE are performed.

Moreover, since the force touch electrode FTE is electrically floated in the touch position sensing and the touch driving signal TDS is applied to the force touch electrode FTE in the touch force sensing, the electronic device according to the present embodiment may sense a touch position and a force touch independently from static electricity or frequency noise which occurs in the driving circuit unit 900 accommodated into the housing 500

Figure 18:
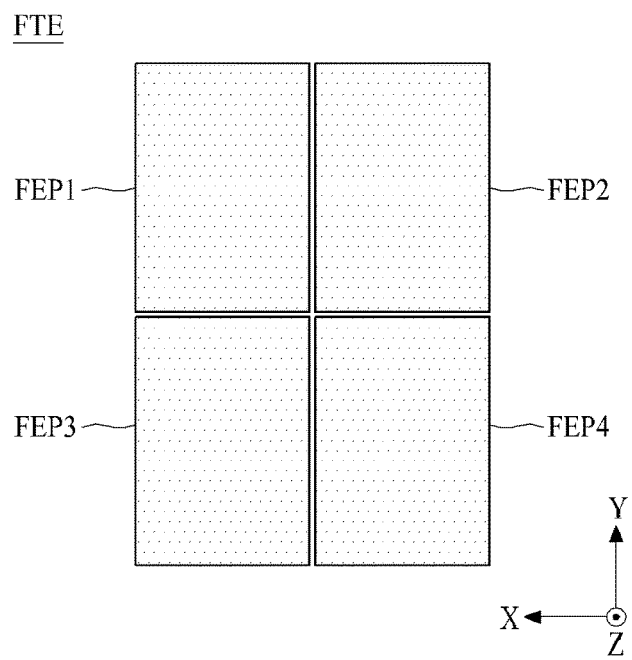
FIG. 18 is a diagram for describing a modification example of a force touch electrode illustrated in FIG. 15.

FIG. 18 is a diagram for describing a modified example of the force touch electrode illustrated in FIG. 15.

Referring to FIG. 18 along with FIGS. 15 to 17, in an electronic device according to the present embodiment, a force touch electrode FTE may include a plurality of force electrode patterns FEP1 to FEP4.

Each of the plurality of force electrode patterns FEP1 to FEP4 may be spaced part from each other and may be provided in lattice type in the display panel 110 (i.e., on the rear surface of the lower substrate 111) to overlap the housing plate 510. Therefore, a plurality of capacitors may be provided between each of the plurality of force electrode patterns FEP1 to FEP4 and the housing plate 510. In this case, a capacitance of each of the plurality of capacitors may vary based on a distance variation between a corresponding force electrode pattern and the housing plate 510. Each of the plurality of force electrode patterns FEP1 to FEP4 may be used to sense a multi-force touch in the touch sensing mode TM.

Each of the plurality of force electrode patterns FEP1 to FEP4 may be individually connected to the driving circuit unit 900 (i.e., the force touch driver 990) through a plurality of force routing lines.

In response to the mode signal MS having the first logic state which is supplied from the host controller 910, as shown in FIG. 16, the force touch driver 990 according to an embodiment may electrically change each of the plurality of force electrode patterns FEP1 to FEP4 to the high impedance state during the display mode DM. Therefore, since each of the plurality of force electrode patterns FEP1 to FEP4 is electrically changed to the high impedance state (i.e., electrically floated) during the display mode DM, each of the plurality of force electrode patterns FEP1 to FEP4 may act as a noise blocking layer that prevents static electricity or frequency noise, occurring in the driving circuit unit 900 accommodated into the housing 500, from flowing into the display panel 110.

Moreover, as shown in FIG. 16, in response to the mode signal MS having the second logic state which is supplied from the host controller 910, during the touch sensing mode TM, the force touch driver 990 according to an embodiment may apply the touch driving signal TDS to each of the plurality of force electrode patterns FEP1 to FEP4 through the plurality of force routing lines, sense a capacitance variation between each of the plurality of force electrode patterns FEP1 to FEP4 and the housing 500 through the plurality of force routing lines to sequentially generate pieces of force raw data, and supply the pieces of force raw data to the host controller 910.

In response to the mode signal MS having the first logic state which is supplied from the host controller 910, as shown in FIG. 17, the force touch driver 990 according to an embodiment may electrically change (i.e., electrically float) each of the plurality of force electrode patterns FEP1 to FEP4 to the high impedance state through the plurality of force routing lines during the display mode DM. Therefore, since each of the plurality of force electrode patterns FEP1 to FEP4 is electrically floated during the display mode DM, each of the plurality of force electrode patterns FEP1 to FEP4 may act as a noise blocking layer that prevents static electricity or frequency noise, occurring in the driving circuit unit 900 accommodated into the housing 500, from flowing into the display panel 110.

As shown in FIG. 17, the force touch driver 990 according to an embodiment may electrically float each of the plurality of force electrode patterns FEP1 to FEP4 through the plurality of force routing lines during the first touch sensing period P1 according to the touch sensing period TSPS or the first touch sensing period P1 of the mode signal MS having the second logic state which is supplied from the host controller 910, thereby preventing static electricity or frequency noise, occurring in the driving circuit unit 900 accommodated into the housing 500, from flowing into the touch electrode TE.

Moreover, as shown in FIG. 17, the force touch driver 990 according to an embodiment may supply the touch driving signal TDS to each of the plurality of force electrode patterns FEP1 to FEP4 through the plurality of force routing lines during the second touch sensing period P2 according to the touch sensing period TSPS or the second touch sensing period P2 of the mode signal MS having the second logic state which is supplied from the host controller 910, sense a capacitance variation between each of the plurality of force electrode patterns FEP1 to FEP4 and the housing 500 through the plurality of force routing lines to sequentially generate pieces of force raw data, and supply the pieces of force raw data to the host controller 910.

The electronic device according to the present embodiment may individually sense a touch force through each of the plurality of force electrode patterns FEP1 to FEP4 to sense a multi-force touch, calculate a position of a force touch and a position-based touch force, and execute various applications corresponding thereto. Particularly, in the present embodiment, a position-based touch force corresponding to each of the plurality of force electrode patterns FEP1 to FEP4 may be subdivided, and a force touch-based security application may be applied, thereby increasing security of the electronic device. Here, the security application may be an application for performing a lock function or an unlock function of the electronic device.

Figure 19:
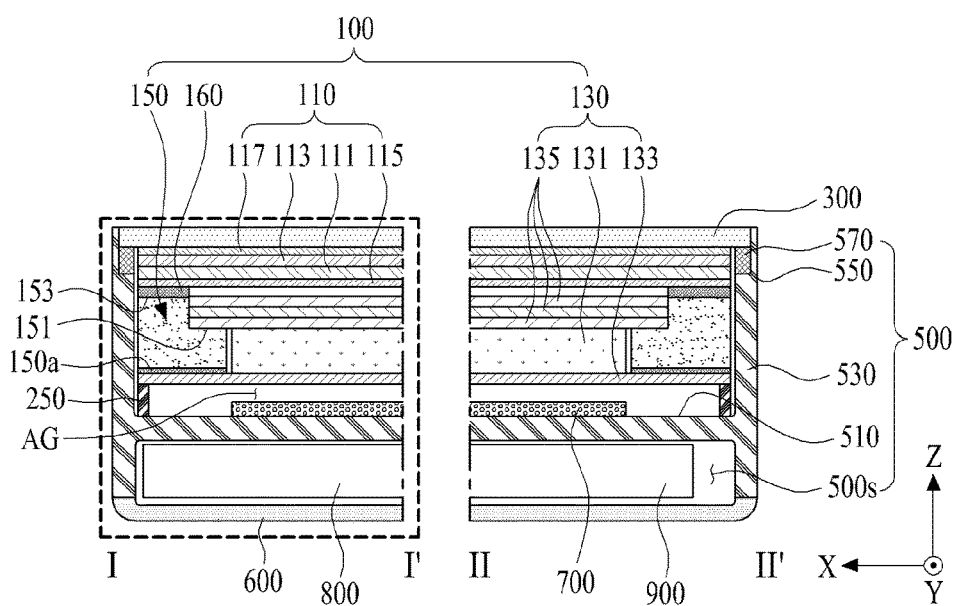
FIG. 19 is another cross-sectional view taken along line I-I' and line II-IF illustrated in FIG. 1.

FIG. 19 is another cross-sectional view taken along line I-I' and line II-IF illustrated in FIG. 1 and illustrates a configuration where a module supporting member 250 is additionally provided in the electronic device illustrated in FIG. 2.

Referring to FIG. 19 along with FIG. 1, the module supporting member 250 of the electronic device according to the present embodiment may be vertically provided between a rear edge of the display module 100 and a front edge of the housing plate 510 to have a certain height and may provide an air gap AG between the rear surface of the display module 100 and the housing plate 510. That is, the module supporting member 250 may be provided between the rear edge of the display module 100 and the front edge of the housing plate 510, and by using the front edge of the housing plate 510 as a supporter, the module supporting member 250 may separate the reflective sheet 133 of the display module 100 from a front surface of the housing plate 510 by a certain interval, thereby providing the air gap AG between the rear surface of the display module 100 and the housing plate 510.

The air gap AG may be defined as a separation space between the rear surface of the display module 100 and the housing plate 510. The air gap AG may provide a space which enables the display module 100 to move in the up and down direction Z by a touch pressure of a user, and thus, the cover window 300 and the display module 100 may be deformed to a curved shape according to the touch pressure of the user.

The module supporting member 250 may include an elastic pad having an elastic restoring force, a double-sided adhesive foam pad, or a spring. The module supporting member 250 may elastically support the display module 100 and may attach the display module 100 to the housing plate 510.

In addition, in the present embodiment, the cover window 300 may be supported without being attached to the entire front surface of the display panel 110 by a transparent adhesive member and may be supported by the housing 500. For example, the cover window 300 may be coupled to the elastic member 570 disposed in the groove 550 of the housing side wall 530. Therefore, the cover window 300 may cover the entire front surface of the display panel 110 and a space between the display module 100 and the housing side wall 530, thereby protecting the display module 100 from impact and preventing foreign material from penetrating into the space between the display module 100 and the housing side wall 530.

In the electronic device according to the present embodiment, the module supporting member 250 may be disposed between the display module 100 and the housing plate 510 to provide the air gap AG between the display module 100 and the housing plate 510, and thus, it is not required to attach the display module 100 to the cover window 300 for providing the air gap AG. Therefore, in the present embodiment, the optical adhesive member 200 may be omitted like the electronic device illustrated in FIG. 2.

The module supporting member 250 according to the present embodiment may be provided between the display module 100 and the housing plate 510 of the electronic device illustrated in FIGS. 13 to 15 to provide the air gap AG between the display module 100 and the housing plate 510. In this case, the optical adhesive member 200 may be omitted, and the cover window 300 may be supported without being attached to the entire front surface of the display panel 110 and may be supported by the housing 500.

Figure 20:
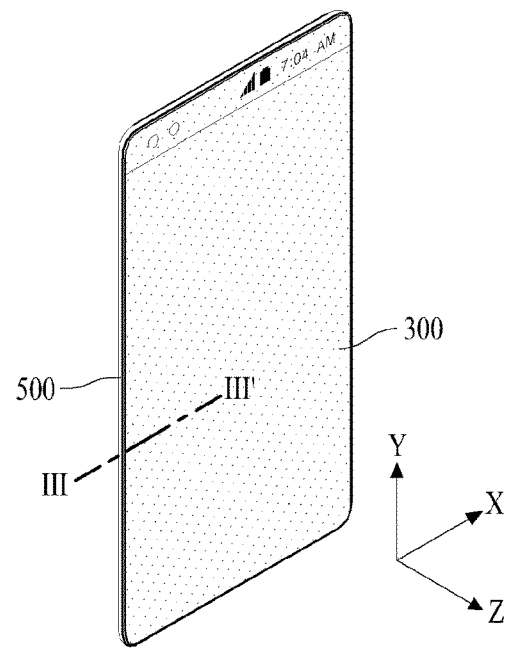
FIG. 20 is a perspective view illustrating an electronic device according to an embodiment.
Figure 21:
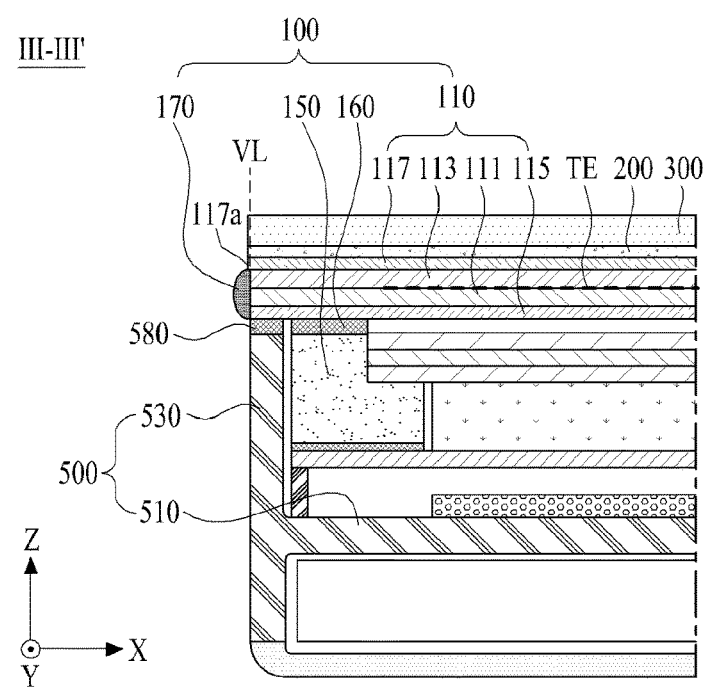
FIG. 21 is cross-sectional view taken along line illustrated in FIG. 20.

FIG. 20 is a perspective view illustrating an electronic device according to an embodiment, and FIG. 21 is cross-sectional view taken along line III-III' illustrated in FIG. 20. The electronic device may be implemented by modifying a supporting structure of a display module. Hereinafter, therefore, elements other than elements associated with the supporting structure of the display module are the same as those of FIGS. 1 to 19, and thus, repetitive descriptions on the same elements are omitted.

Referring to FIGS. 20 and 21, in the electronic device according to an embodiment, a display module 100 may be directly supported to a housing side wall of a housing 500. That is, the housing side wall 530 may support the display module 100, and in more detail, may support a rear edge of the display panel 110 without surrounding each of side walls of the display panel 110. An outermost surface of the housing side wall 530 may be disposed on the same vertical line VL as an outermost surface of the display panel 110, may be disposed to slightly protrude more outward than the vertical line VL, or may be disposed more inward than the vertical line VL. Accordingly, when seen from the front of the display panel 110 at which a user (or a viewer) is located, the housing side wall 530 may be almost covered by the display panel 110.

The housing side wall 530 according to an embodiment may support the display panel 110, and in more detail, may support a rear edge of a lower polarizing member 115. In this case, the lower polarizing member 115 may relax an impact applied to the display panel 110.

The housing side wall 530 according to an embodiment may directly support a rear edge of a lower substrate 111, and to this end, an edge of the lower polarizing member 115 may be removed. In this case, the electronic device according to an embodiment may be slimmed by a size of an area secured by removing the lower polarizing member 115.

The housing side wall 530 may support a rear edge of the display panel 110 by using a supporting member 580. The supporting member 580 according to an embodiment may include an elastic pad having an elastic restoring force, a double-sided adhesive foam pad, or the like. The supporting member 580 prevents a direct contact between the display panel 110 and the housing side wall 530 and prevents foreign materials from penetrating into a space between the display panel 110 and the housing side wall 530.

Optionally, the display module 100 according to the present embodiment may further include a side sealing member 170 covering each of outer surfaces of the display panel 110.

The side sealing member 170 may be provided to cover the lower polarizing member 115 and an outermost surface of each of the lower substrate 111 and an upper substrate 113. The side sealing member 170 prevents the side light leakage of the display panel 110, namely, the side light leakage of light traveling from the inside to the outermost surface of the upper substrate 113.

The side sealing member 170 may be formed of a silicon-based or ultraviolet (UV) curing-based sealant (or resin), but considering a process tack time, the side sealing member 170 may be formed of the UV curing-based sealant. Also, the side sealing member 170 may have a color (for example, blue, red, bluish green, or black), but may be formed of a colored resin or a light blocking resin for preventing side light leakage without being limited thereto.

A portion of a top of the side sealing member 170 may be covered by an upper polarizing member 117. To this end, the upper polarizing member 117 may include an extension portion 117a which extends to cover a portion of a front surface of the side sealing member 170 and is adhered to the portion of the front surface of the side sealing member 170. Therefore, a junction surface between the side sealing member 170 and the display panel 110 may be covered by the extension portion 117a of the upper polarizing member 117.

In addition, the side sealing member 170 may be provided to cover a side surface of each of the upper polarizing member 117 and the cover window 300, in addition to the lower polarizing member 115 and the outermost surface of each of the lower substrate 111 and the upper substrate 113. In this case, the side sealing member 170 prevents the side light leakage of light traveling from the inside to the outermost surface of the upper substrate 113.

As described above, in the present embodiment, since the housing side wall 530 supports a rear surface of the display panel 110, a bezel width of the electronic device may be removed due to the housing side wall 530, thereby realizing a zero bezel display.

Figure 22:
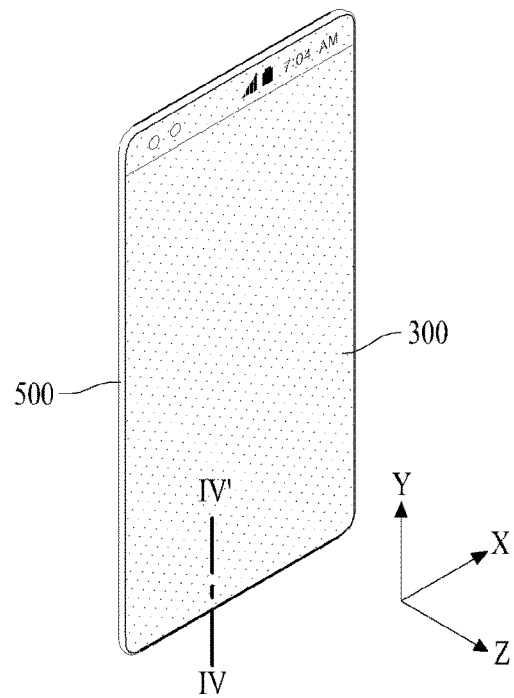
FIG. 22 is a perspective view illustrating an electronic device according to an embodiment.
Figure 23:
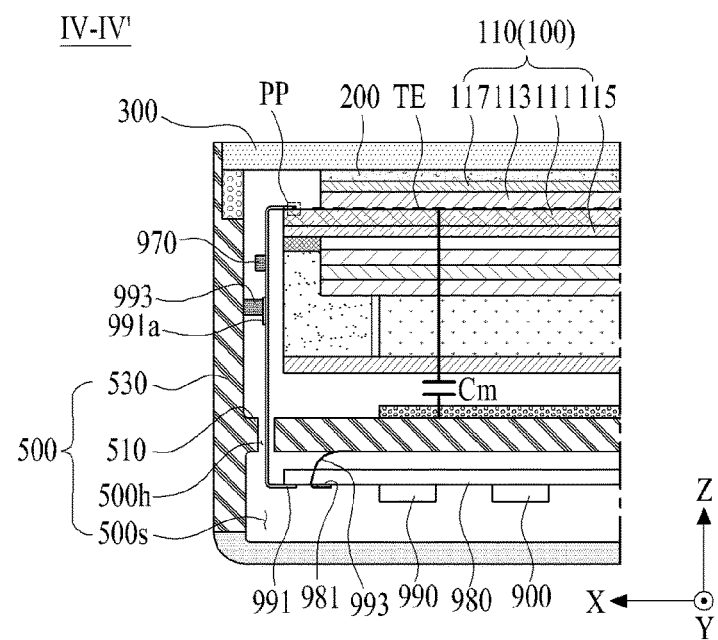
FIG. 23 is cross-sectional view taken along line IV-IV' illustrated in FIG. 22.

FIG. 22 is a perspective view illustrating an electronic device according to an embodiment, and FIG. 23 is cross-sectional view taken along line IV-IV' illustrated in FIG. 22. The drawings are for describing an electrical connection structure of a housing. Hereinafter, therefore, elements other than elements associated with the electrical connection structure of the housing are the same as those of FIGS. 1 to 21, and thus, repetitive descriptions on the same elements art omitted.

Referring to FIGS. 22 and 23, the electronic device according to an embodiment may further include a printed circuit board (PCB) 980, a power supply circuit 990, a flexible circuit film 991, and a conductive connection member 993.

The PCB 980 may be accommodated into a system accommodating space 500s of a housing 500 to support the power supply circuit 990, and for example, may support the above-described driving circuit unit 900 according to the present embodiment.

The power supply circuit 990 may generate and output a ground voltage and a driving voltage which includes a DC voltage and an AC voltage necessary for displaying an image on a display panel 110, based on input power supplied from an external power source or a battery.

The flexible circuit film 991 may connect the PCB 980 to a pad part PP provided on a lower substrate 111 of the display panel 110. One end of the flexible circuit film 991 may be electrically connected to the pad part PP through a film through hole 500h provided in a housing plate 510. Also, the other end of the flexible circuit film 991 is electrically connected to the PCB 980. The flexible circuit film 991 may supply through the pad part PP a signal, output from the driving circuit unit 900, to a signal line provided on the lower substrate 111.

Optionally, a panel driver 970 included in the driving circuit unit 900 may be mounted on the flexible circuit film 991 and may be electrically connected to the signal line, provided on the lower substrate 111, through the pad part PP. Also, the panel driver 970 may be disposed in a circuit mounting area provided on the lower substrate 111, electrically connected to the pad part PP, and electrically connected to the signal line provided on the lower substrate 111.

The conductive connection member 993 may supply the ground voltage or an AC or DC voltage having a certain voltage level, which is supplied from the power supply circuit 990, to the housing 500, thereby allowing the housing 500 to be electrically grounded (GND) or to be maintained at a certain voltage level.

The conductive connection member 993 according to an embodiment may electrically connect a housing side wall 530 and a power pad 991a provided on the flexible circuit film 991 parallel with the housing side wall 530. One side of the conductive connection member 993 may be electrically connected to the power pad 991a provided on the flexible circuit film 991, and the other side of the conductive connection member 993 may be electrically connected to an inner wall of the housing side wall 530. In this case, the conductive connection member 993 may be electrically connected to each of the power pad 991a and the housing side wall 530 by using a conductive adhesive. Therefore, the conductive connection member 993 may apply the ground voltage or the AC or DC voltage having a certain voltage level, which is supplied from the power supply circuit 990 to the power pad 991a, to the housing side wall 530. In this case, the conductive connection member 993 may be a conductive wire, a conductive tape, a conductive paste, or the like.

The conductive connection member 993 according to an embodiment may electrically connect a housing plate 510 and a power pad 981 provided on the PCB 980 without electrically connecting the housing side wall 530 and the power pad 991a provided on the flexible circuit film 991. That is, the one side of the conductive connection member 993 may be electrically connected to the power pad 981 which is provided on a first surface of the PCB 980 facing the housing plate 510 or a second surface opposite to the first surface, and the other side of the conductive connection member 991 may be electrically connected to a rear surface of the housing plate 510 facing the PCB 980. In this case, the conductive connection member 993 may electrically connect the power pad 991a to a rear surface of the housing plate 510 by using a conductive adhesive. Therefore, the conductive connection member 993 may apply the ground voltage or the AC or DC voltage having a certain voltage level, which is supplied from the power supply circuit 990 to the power pad 991a, to the housing plate 510. In this case, the conductive connection member 993 may be a conductive wire, a conductive tape, or the like.

As described above, in the present embodiment, since the ground voltage or the AC or DC voltage having a certain voltage level is supplied to the housing 500 through the conductive connection member 993, a variation of a capacitance caused by a variation of a distance between the housing plate 510 and a touch electrode TE is easily sensed based on a voltage supplied to the housing 500.

In addition, in FIG. 1, a smartphone is illustrated as the electronic device according to an embodiment, but the present embodiment is not limited thereto. An embodiment of the present embodiment may be identically applied to all electronic devices which each include a display module, including a self-capacitance in-cell touch panel, and a housing which includes a metal material and accommodates the display module. Here, the electronic device may be one of portable electronic devices, such as electronic notebooks, e-books, portable multimedia players (PMPs), navigation devices, ultra-mobile personal computers (UMPCs), mobile phones, tablet PCs, smartwatches, watch phones, wearable devices, mobile communication terminals, etc., and appliances such as televisions (TVs), notebook computers, monitors, camcorders, displays, etc. Also, the electronic device according to an embodiment of the present embodiment may be identically applied to organic light emitting display devices which each include an organic light emitting display module, including an in-cell touch panel including an organic light emitting device, and a housing which includes a metal material and accommodates the organic light emitting display module, in addition to a display panel including a liquid crystal layer.

According to the embodiments of the present invention, when a user touch is applied, a touch position and a touch force may be sensed based on a capacitance variation rate caused by a distance variation between the touch sensor and the housing plate, and particularly, a force touch of the user may be sensed even without a separate force sensing panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electronic device comprising:
a display module including a plurality of touch electrodes;
a cover window covering a front surface of the display module; and
a housing including:
an electrically conductive housing plate, the electrically conductive housing plate overlapping with the plurality of touch electrodes and disposed below a rear surface of the display module, and
a housing side wall surrounding at least a portion of a side surface of the display module or supporting the display module,
wherein a variation in capacitance is sensed between one or more of the touch electrodes and the housing plate, caused by a change in distance between said one or more of the touch electrodes and the housing plate,
wherein the display module includes a display panel including a lower substrate and an upper substrate,
wherein the plurality of touch electrodes are disposed between the lower substrate and the upper substrate of the display panel, and are used as common electrodes during a display mode, and
wherein the housing plate is physically connected to the housing sidewall and extends below the rear surface of the display module from a first portion of the housing sidewall to a second portion of the housing sidewall.

2. The electronic device of claim 1, wherein
a touch driving signal is applied to said one or more of the touch electrodes, and a variation in capacitance is sensed between said one or more of the touch electrodes and the housing plate to generate touch raw data during a touch sensing mode, and
wherein a touch position is calculated based on the touch raw data which is less than reference raw data and a touch force level based on the touch raw data which exceeds the reference raw data.

3. The electronic device of claim 1, wherein the display module further comprises a transparent conductive layer provided on a rear surface of the lower substrate.

4. The electronic device of claim 3, wherein the transparent conductive layer is electrically floated.

5. The electronic device of claim 3, wherein
a touch driving signal is applied to said one or more of the touch electrodes and a variation in self-capacitance of said one or more of the touch electrodes is sensed to generate touch raw data during a first touch sensing period of a touch sensing mode,
wherein a force touch driving signal is applied to the transparent conductive layer and a variation in capacitance is sensed between the transparent conductive layer and the housing plate to generate force touch raw data during a second touch sensing period of the touch sensing mode, and
wherein a touch position is calculated based on the touch raw data and a touch force level is calculated based on the force touch raw data.

6. The electronic device of claim 5, wherein during the display mode, the touch electrodes are supplied with a common voltage, and the transparent conductive layer is electrically floated.

7. The electronic device of claim 5, wherein the touch electrodes are supplied with a common voltage during the display mode, and
wherein the transparent conductive layer is electrically floated during the display mode and is electrically floated during the first touch sensing period.

8. The electronic device of claim 1, further comprising a buffering member disposed on the housing plate and spaced apart from the rear surface of the display module, the buffering member positioned so as not to overlap with a rear edge of the display module.

9. The electronic device of claim 8, wherein the buffering member comprises a circular shape in a plan view centered around a center of the display module.

10. The electronic device of claim 8, wherein the buffering member comprises a tetragonal shape in a plan view centered around a center of the display module.

11. The electronic device of claim 10, wherein one or more corners of the tetragonal shape in a plan view of the buffering member are rounded.

12. The electronic device of claim 8, wherein the buffering member comprises polyurethane.

13. The electronic device of claim 1, wherein the housing side wall includes a groove in an inner surface thereof, and an elastic member between a rear edge of the cover window and a bottom of the groove, the cover window covering an entire surface of the display module and a space between the display module and the housing side wall.

14. The electronic device of claim 1, wherein the housing side wall supports a rear edge of the display module with a supporting member between the housing side wall and the display module.

15. The electronic device of claim 14, wherein the supporting member is comprised of an elastic pad or an adhesive foam pad.

16. The electronic device of claim 1, further comprising a side sealing member covering an outer side surface of the display module.

17. The electronic device of claim 16, wherein at least a part of the display module covers a front surface of the side sealing member.

18. The electronic device of claim 1, further comprising a module supporting member vertically provided between a rear edge of the display module and a front edge of the housing plate to create an air gap between the rear surface of the display module and the housing plate.

19. The electronic device of claim 1, further comprising:
- a printed circuit board disposed under the housing plate; and
- a flexible circuit film electronically connecting the printed circuit board with a part of the display module, the flexible circuit film extending from the printed circuit board to the part of the display module through a film through hole in the housing plate.

20. The electronic device of claim 19, further comprising a conductive connection member electrically connecting the printed circuit board with the housing plate, the housing plate being grounded through the conductive connection member.

21. The electronic device of claim 1, wherein the housing plate is supplied with a direct current (DC) voltage or an alternating current (AC) voltage having a certain voltage level or being electrically grounded (GND).

* * * * *